United States Patent [19]

Sasser et al.

[11] Patent Number: 5,052,799
[45] Date of Patent: Oct. 1, 1991

[54] OBJECT ORIENTING SYSTEMS AND SYSTEMS AND PROCESSES RELATING THERETO

[76] Inventors: Thurman Sasser, 1826 Sarazen Dr., Orlando, Fla. 32808; Roger L. Martin, P.O. Box 5591, Deltona, Fla. 32728

[21] Appl. No.: 380,521

[22] Filed: Jul. 17, 1989

[51] Int. Cl.$^5$ .......................... G01C 1/00; G09G 1/06; G01S 13/00

[52] U.S. Cl. ................................... 356/152; 356/364; 342/147; 342/364; 342/386; 180/168; 340/727; 340/901; 340/988; 340/995; 364/443; 364/449

[58] Field of Search ....................... 356/1, 4, 141, 152, 356/364; 342/147, 361, 365, 366, 386, 450, 451; 180/167, 168; 340/727, 901, 905, 988, 995; 364/443, 449

[56] References Cited

U.S. PATENT DOCUMENTS

| | | | |
|---|---|---|---|
| 3,764,218 | 10/1973 | Schedewie | 356/152 X |
| 4,053,882 | 10/1977 | Van Etten | 342/188 |
| 4,484,192 | 11/1984 | Seitz et al. | 340/727 X |
| 4,520,362 | 5/1985 | Charlot | 342/361 |
| 4,527,155 | 7/1985 | Yamaki et al. | 340/995 X |
| 4,660,045 | 4/1987 | Clark | 342/361 |
| 4,771,288 | 9/1988 | Johnson | 342/188 |
| 4,773,018 | 9/1988 | Lundström | 364/443 |
| 4,815,840 | 3/1989 | Benayad-Cherif | 356/1 |

Primary Examiner—Linda J. Wallace
Attorney, Agent, or Firm—Arthur G. Yeager

[57] ABSTRACT

A reference signal used for orienting an object has a beam of electromagnetic radiation with a first signal component that is a rotating component and also a second signal component which is periodically generated when the first signal component is in a predetermined direction. The beam may be a linearly polarized laser light beam with a rotating plane of polarization, an unpolarized laser light beam with a rotating and shaped image of predetermined configuration, or a linearly polarized microwave beam with a rotating plane of polarization. The second signal component may be generated as a component of the beam bearing the first signal component or separately generated and propagated. Provisions are made for receiving and comparing the direction indicated by the reference signal with the direction of the object to be oriented and the information derived from the comparison is analyzed and processed to provide an output signal that useful in orienting the object. The orientation of video displays, vehicles and parts of vehicles are illustrated.

59 Claims, 15 Drawing Sheets

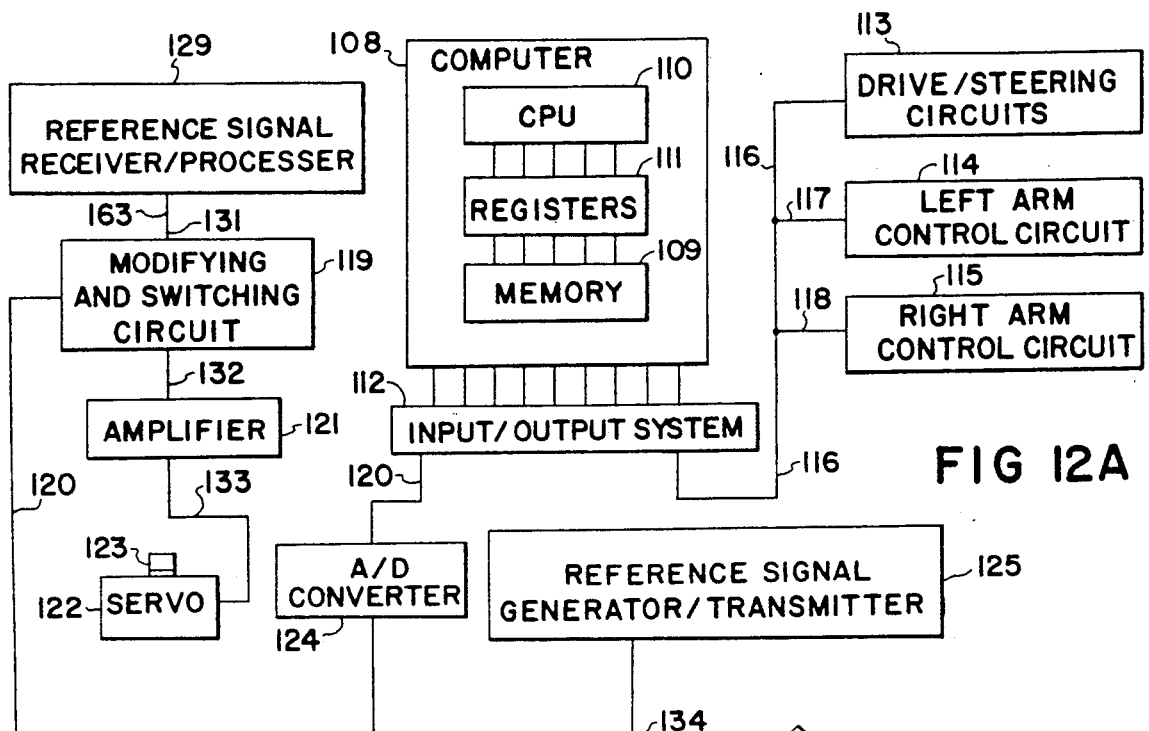
FIG 12A
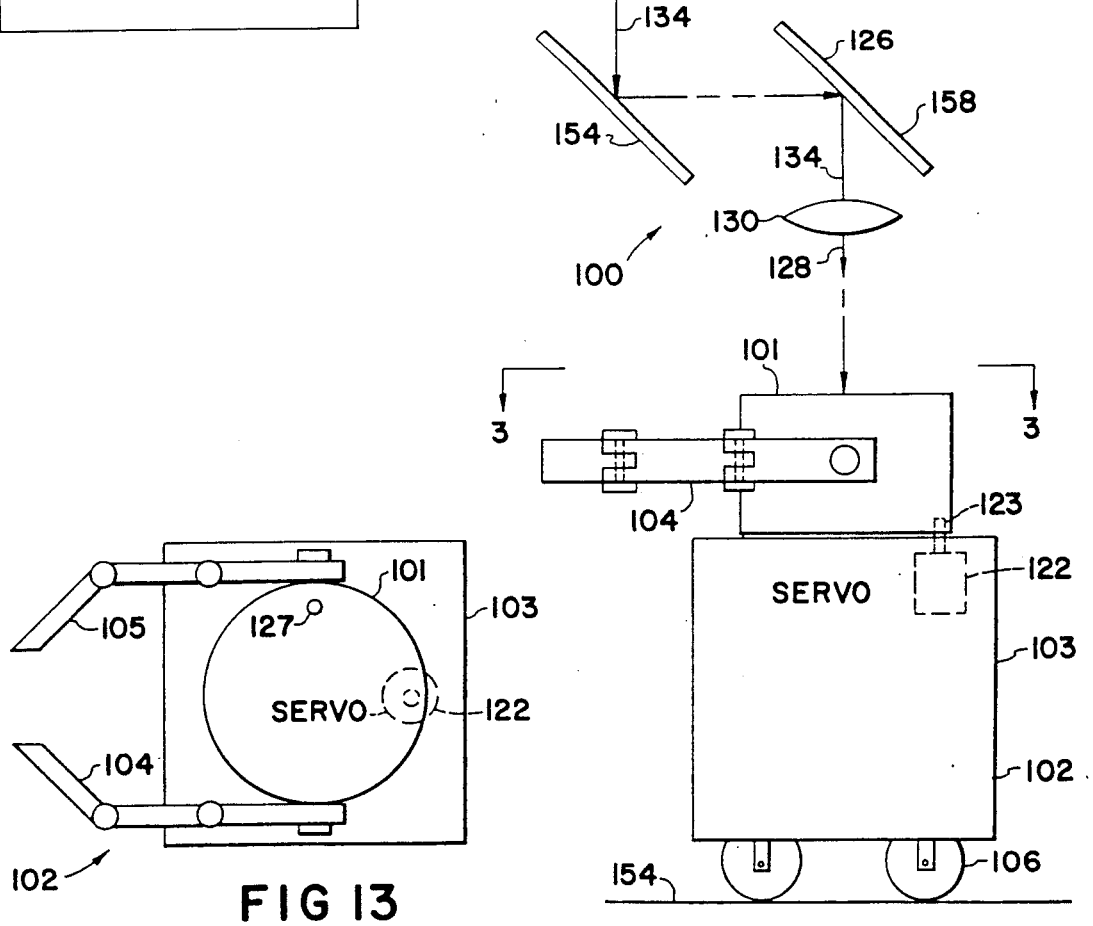
FIG 13
FIG 12

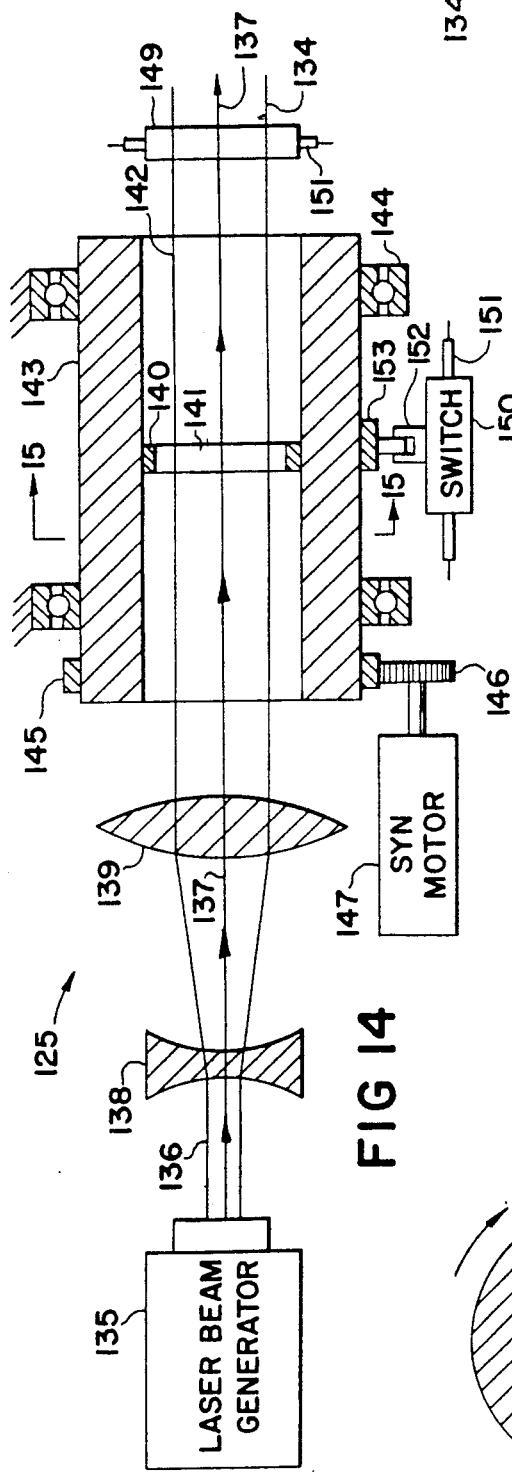
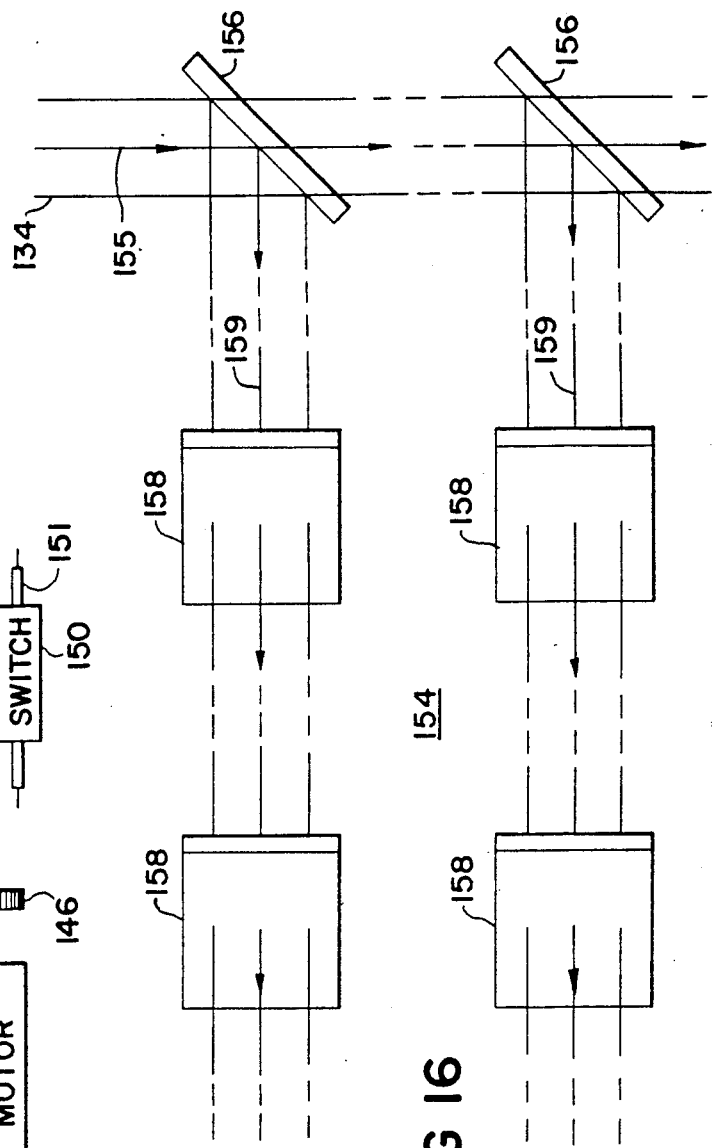
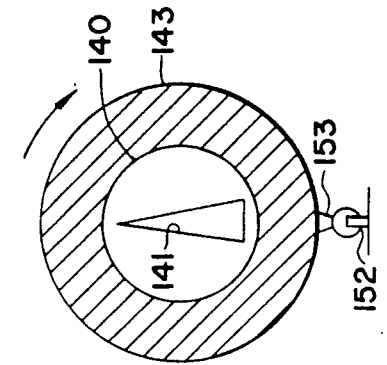
FIG 14
FIG 15
FIG 16

OBJECT ORIENTING SYSTEMS AND SYSTEMS AND PROCESSES RELATING THERETO

BACKGROUND OF THE INVENTION

This invention relates to systems for use in orienting an object and to systems and processes relating to the generation and/or use of reference signals which bear directional information.

Many systems for orienting the direction of an object in a plane of general movement therefore depend upon the earth's magnetic field to provide the reference direction that serves as the basis for determining the necessary adjustments to the direction of the object. While generally useful, the magnetic field of the earth is known to vary and change in certain areas of the world so that such use of the magnetic field to provide a directional reference has its limitations.

Apart from the variances in the earth's magnetic field in difference locals, the earth's magnetic field is distorted in highly populated areas where the ever present steel structures act as magnetic shields that serve to collapse and/or distort the local magnetic field. As such, magnetic compass bearings in such areas are unreliable so that directional bearings which are taken by magnetic compasses provide a poor reference source for use in orienting the direction of an object.

Within buildings that have a skeletal steel structure, and in storage areas where steel or other field collapsing items are stored, the use of the earth's magnetic field as a directional reference for the automatic orientation of objects is also impractical. In such places, the automatic directional orientation of objects is frequently accomplished by procedures that involve the sensing of painted strips and other objects, which have a fixed location and, accordingly, have a capability of serving as a reference for automated object movements in the area.

As such, there is a need for a signal that may be used to provide a directional reference in areas where the direction indicated by the earth's magnetic field is unreliable and particularly in areas where the field is distorted by local items and materials that serve as a magnetic shields or drawing points for the earth's magnetic lines of force. In addition there is a general need for systems which provide for the appropriate generation of such signals and facilitate the angular directional orientation of objects through the use thereof.

SUMMARY OF THE INVENTION

The invention involves a direction indicating reference signal that includes a beam of electromagnetic radiation which carries a first signal component that rotates at a uniform angular velocity about the axis of propagation of the beam, and a second signal component that is periodically detectable when the first signal component is oriented in a predetermined angular direction that serves as the reference direction.

In accord with the object orienting system aspects of the invention, provisions are made for receiving the reference signal and comparing the reference direction indicated thereby with the current direction of the object that is being oriented or with another object associated in movement therewith or otherwise equated in directional orientation thereto. This comparison of directions ultimately results in the generation of an output signal that is indicative of the angular deviation in the object's current direction from that indicated by the reference signal and provisions are made to use this deviation signal in controlling the directional orientation of the object.

Certain aspects of the invention are designed for use under environmental conditions that have little or no effect on the transmission of light signals. Here the electromagnetic radiation preferably contemplated for use is a monochromatic coherent light that is provided by a beam of coherent laser light which is transformed into a linearly polarized light beam with a rotating plane of polarization that provides the first signal component of the reference signal. The second signal component, under such circumstances, is preferably a pulse of non-polarized or unpolarized laser light that is generated when the angular orientation of the rotating plane of polarization of the beam is in a predetermined direction during its rotational movement and which serves as the reference direction. A determination of the angular deviation in the object's current direction, or that of another object associated in movement with the object, from this reference direction serves as a basis for controlling the directional orientation of the object.

Other aspects of the invention also contemplate the transmission of light signals that are nonpolarized and which again preferably involve the use of use a monochromatic and coherent light beam source, such as a laser light source. In accord with these aspects, the beam of light is suitably treated and shaped to provide a rotating image along the axis of propagation of the beam. This rotating image serves as the first signal component of the reference signal under these circumstances and the second signal component is again generated when the angular orientation of the rotating image is in a predetermined direction that serves as the reference direction. Once again, a determination of the angular deviation in the object's current direction or in that of another object associated in movement therewith is used as a basis for controlling the directional orientation of the object.

Yet another aspect of the invention contemplates a system which can tolerate environmental conditions which are impervious to light transmission. Here the object orienting system contemplates the use of microwave radiation, the microwave beam being linearly polarized and caused to provide a rotating plane of polarization that serves as the first signal component of the reference signal. The second signal component is produced by generating a microwave pulse output which is preferably unpolarized but which is generated when the plane of polarization of the beam is in a predetermined angular direction that again serves as the reference direction. Once again, a determination of the angular deviation in the object's current direction from this reference direction is used as a basis for controlling the directional orientation of the object.

Other aspects of the invention will be evident from the following detailed description of the embodiments set forth.

BRIEF DESCRIPTION OF THE DRAWINGS

The novel features which are believed to be characteristic of this invention are set forth with particularity in the appended claims. The invention, itself, however, both as to its organization and methods of operation, together with further objects and advantages thereof, may best be understood by reference to the following description taken in connection with the accompanying drawings, wherein:

FIG. 12 schematically illustrates a second embodiment of the invention;

FIG. 12a schematically illustrates certain components of the turret orienting system contemplated in the embodiment shown in FIG. 12 together with certain components involved in controlling the general movements of the robot, the components illustrated being housed in the turret component of the robot.

FIG. 13 schematically illustrates the top view of a self-propelled and maneuverable robot seen in FIG. 12 and as seen along the lines 13—13 therein;

FIG. 14 schematically illustrates the system components of a reference signal generating and transmitting system seen in FIG. 12, certain of the system components being diagrammatically shown in vertical section;

FIG. 15 is a section view through a component of the reference signal generating system seen in FIG. 14, the view being in elevation and as generally seen along the lines 15—15 therein;

FIG. 16 schematically illustrates a signal distribution system that may be used to deliver the reference signal to the work area traversed by the robot seen in FIG. 12, the distribution system being illustrated in top plan view;

DESCRIPTION OF THE EMBODIMENTS

As indicated above, the invention contemplates a reference signal that has two signal components, one signal component being a rotating component and the other signal component being one which is periodically generated when the rotating component is oriented in a predetermined direction during its rotational movements.

The orientation systems may be used to automatically and directionally orient numerous and various different types of objects which, among others, may include land, sea and air vehicles, visual displays, such as screen projected and video displays, for example, of area and/or road maps, machine and gun turrets and the like, and moveable lighting arrays, to name but a few of the objects.

The Polarized Light Embodiment

Reference is made to the embodiment shown in FIGS. 1-11.

Figure 1:
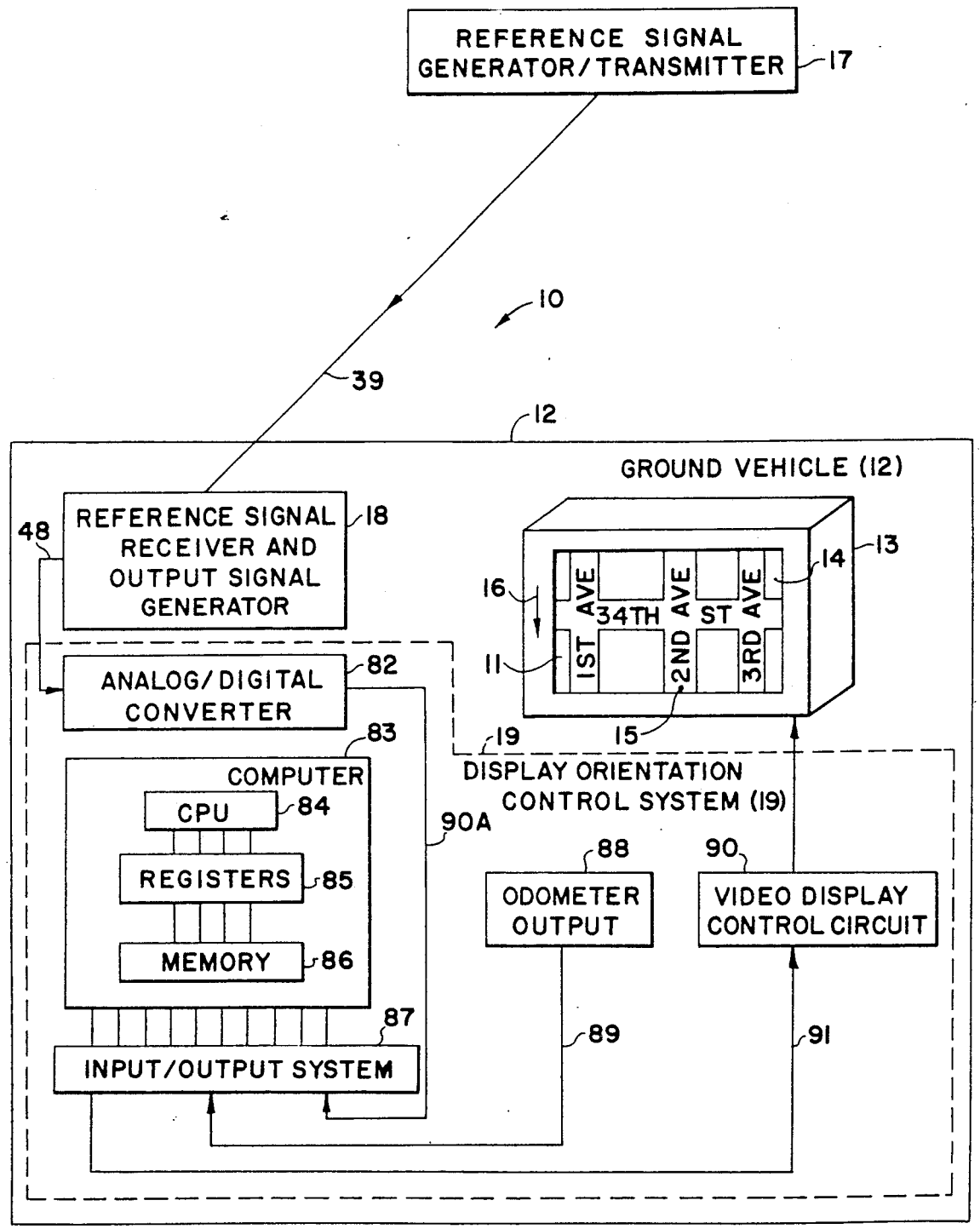
FIG. 1 schematically illustrates a first embodiment of the invention.

FIG. 1 illustrates a system 10 for orienting an object which is shown as a video display 11 that appears on a video display device 13. In this case, the display device 13 is suitably mounted on and moveable with a self-propelled ground vehicle 12, such as a conventional taxi cab that traverses the streets of any modern day city.

The video display device 13 is fixed with respect to the vehicle 12 and may be considered as being used, during movement of the vehicle 12 in a predetermined area contemplated for the movement thereof, to show a graphics display 11 of the streets in the proximate area of the vehicle's location. During use of the video display device 13, the desire is to, at all times, provide a display 11 which is so oriented on the screen 14 as to depict the displayed street scene in front of and in accord with the direction of vehicle orientation and movement. Thus, as the vehicle turns left or right, the desire is to have the display rotate in a clockwise or counterclockwise direction and to an extent that will compensate for the angular change in vehicle direction.

For example, the vehicle 12 is represented in the display 11 by a light spot 15 that remains in the same place on the display screen 14 as the vehicle moves about the city streets. The display 11, on the other hand, is caused to move about on the screen 14 and with respect to the spot 15 as the vehicle 12 thus moves about the city streets. As the vehicle advances on a linear path up the street designated in the display as "2nd Ave", the graphics display 11 is caused to scroll downwardly as in the direction of arrow 16. If the vehicle, while traversing "2nd Ave" turns right on the street designated as "34th St", the desire is to have the display 11 rotate in a counterclockwise direction, as the display is depicted in FIG. 1, and by an angle of 90°, here assuming, of course, that the streets involved in the maneuver are mutually perpendicular. With this in mind, it is apparent that the angular directional orientation of the display 11 is equated in directional orientation to the directional orientation of the vehicle. As such, the angular directional movements of the display 11 are associated with the angular directional movements of the vehicle 12.

The precise method used to cause the display 11 to rotate or scroll in any direction forms no part of the current invention and may take on several different forms depending upon the object in question and which will be apparent to those skilled in the art. On the other hand, the development of a signal that may be used in accomplishing the precise rotary movements of such a display 11 constitutes a principal objective of the invention.

With the above in mind, the display orienting system 10 includes a reference signal generating and transmitting system 17, a reference signal receiving and processing system 18, and a system 19 that operates in dependence upon receipt of an angular deviation output signal from system 18 for controlling the directional orientation of the display 11.

Figure 2:
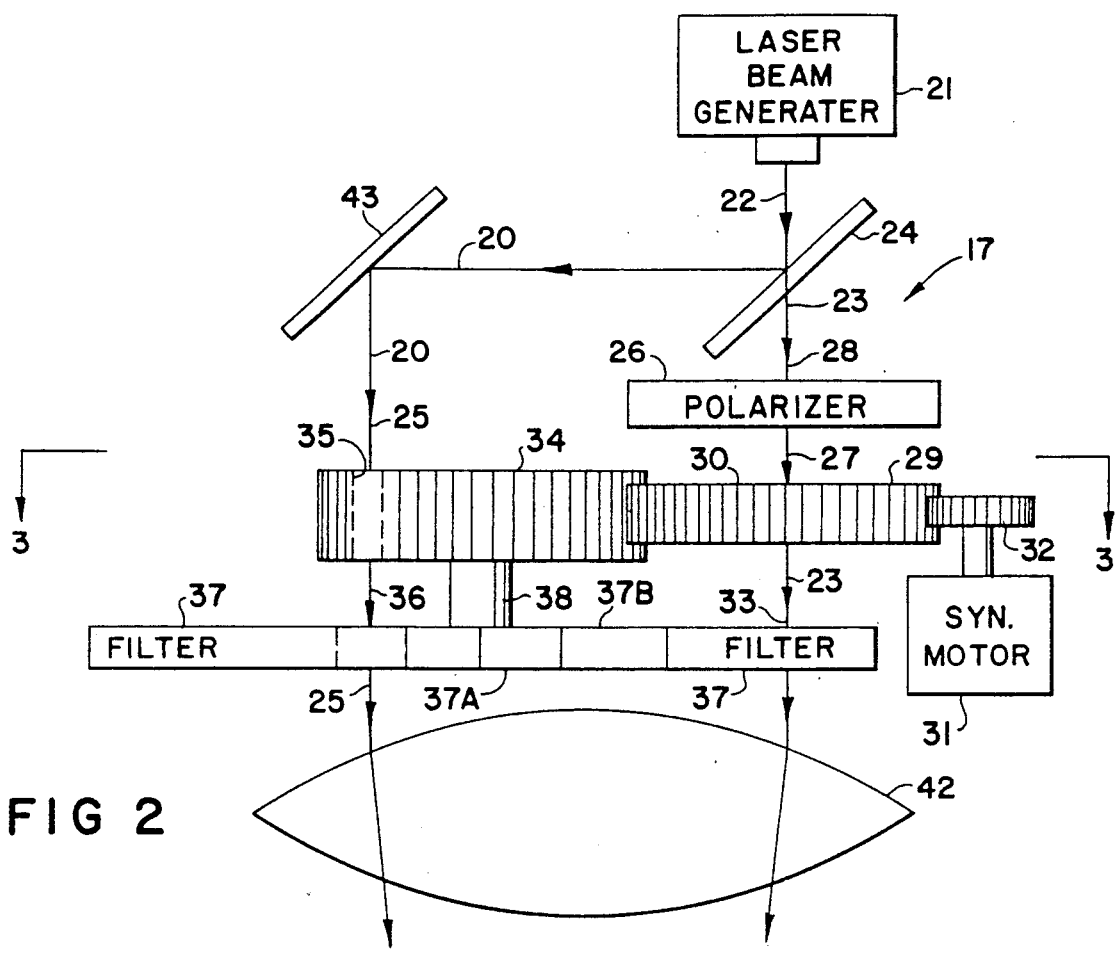
FIG. 2 schematically illustrates a reference signal generating and transmitting system used in the embodiment shown in FIG. 1, certain of the system components being generally shown diagrammatically in side elevation.
Figure 3:
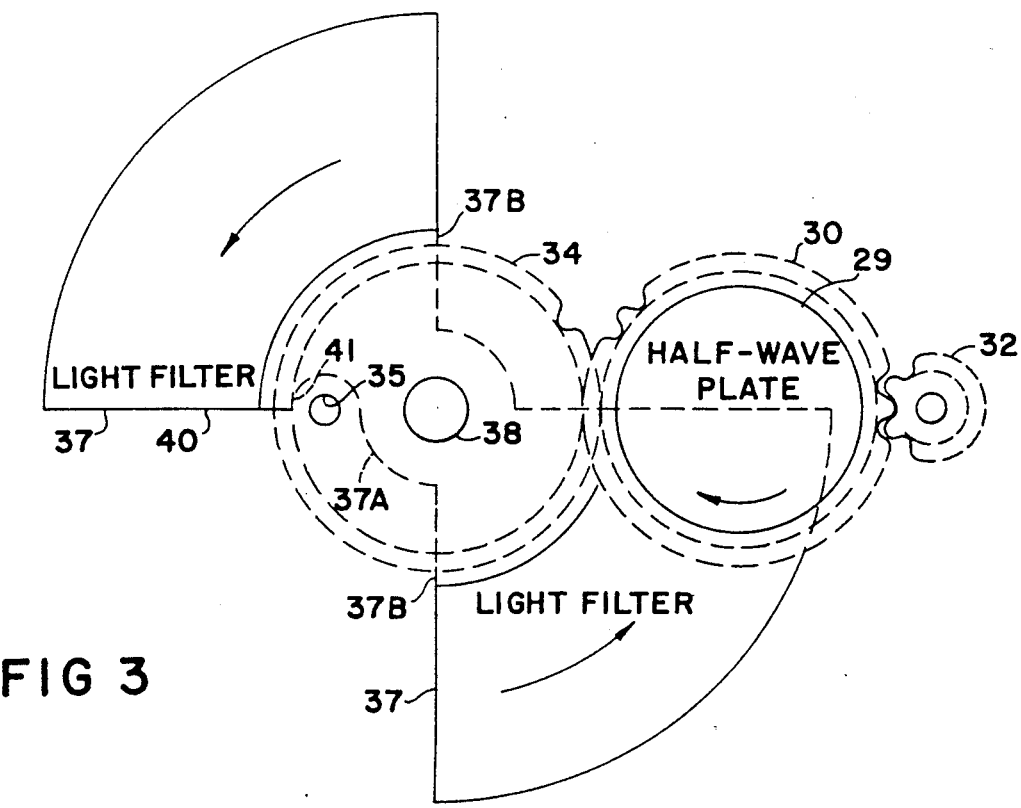
FIG. 3 schematically illustrates certain system components of the reference signal generating and transmitting system shown in FIG. 2 and as seen along the lines 3—3 therein.

System 17 is best understood by reference to FIGS. 2 and 3 and serves to generate and transmit a direction indicating reference signal into a predetermined area that is traversable by the vehicle. The system 17 includes a beam of electromagnetic radiation with a first signal component that rotates at a uniform angular velocity about the axis of propagation of the beam. The reference signal also has a second signal component that is detectable when the first signal component is oriented in a predetermined angular direction and which will be referred to as the "reference direction". In this system 17 the electromagnetic radiation is provided in the form of monochromatic and coherent laser light.

The system 17 includes a laser beam generator 21 that serves as a source of coherent monochromatic light and provides a means for generating an unpolarized laser light beam 22. The beam 22 is propagated by the generator 21 along an axis of propagation that is designated at 23. A portion of the unpolarized beam 22 is deflected, as an unpolarized laser light beam 20, by a pair of optical mirrors 24 and 43, along an auxiliary axis 25 of propagation that is offset from and parallel to axis 23. The undeflected beam portion is transmitted by the optical mirror 24 for further passage along the axis 23 of propagation and as another unpolarized laser light beam designated at 28.

The system 17 has an optical polarizer 26 which is inserted in the path of the beam 28 along the axis 23 of propagation therefore. This polarizer 26 transmits beam 28 as a linearly polarized laser light beam 27 with a plane of polarization that is oriented transversely of the propagation axis 23. Generator 21 and polarizer 26 thus provide a means for generating a linearly polarized light beam 27 and for propagating it along the propagation axis 23.

The system 17 also has a circular disk shaped half-wave plate 29 (FIG. 3) which is inserted in the path of the beam propagation along axis 23. The half-wave plate 29 is securely mounted coaxially with, and in the center of, a hollow spur gear 30 that is, in turn, suitably mounted for coaxial rotation about the propagation axis 23. Also provided is a synchronous motor 31 which rotatably drives another spur gear 32 that is drivingly connected to the half-wave plate bearing spur gear 30. The arrangement provides a means for rotatably driving the half-wave plate 29 at a uniform angular velocity about the axis 23 and is such that the polarized light beam 27 is received and then transmitted by the rotating plate 29 as a rotating linearly polarized laser light beam 33 with a rotating plane of polarization. In lieu of using the half-wave plate to provide a rotating beam of linearly polarized laser light, one may, of course, accomplish the same objective by rotating the polarizer.

The rotating and polarized light beam 33 provides the first signal component of the reference signal in the form of the rotating plane of linearly polarized laser light. The directional orientation of the polarized light plane can be detected during its rotational movement about the axis and its position then compared with the directional orientation of the polarized light plane when the second signal component is generated.

To facilitate the generation of the second signal component of the reference signal when the plane of polarization of beam 33 is oriented in the desired angular direction determined for use as the reference direction, the system 17 is provided with yet another suitably mounted spur gear 34 which is drivingly connected to the wave plate bearing spur gear 30. Gears 34 and 30 are arranged to rotate on a 1:1 basis so that gear 34 rotates one revolution for each revolution made by gear 30.

Spur gear 34 is located along the auxiliary axis 25 of beam propagation and in the path of the deflected beam 20 of unpolarized light. The gear 34 serves to interrupt and generally block passage of the unpolarized beam 20 except under circumstance where an aperture 35 in the gear 34 becomes aligned with the auxiliary propagation axis 25 of the deflected beam 20. When this aperture 35 becomes aligned with the auxiliary axis 25 of propagation, a momentary burst or pulse 36 of unpolarized light passes through the gear 35. This pulse 36 serves as the second signal component of the reference signal, and the direction of the polarized light plane at the time of the pulse 36 constitutes the reference direction used for comparative purposes, as will be seen below. It will be apparent that this reference direction establishing pulse has a time duration that is small in comparison to the time required for a complete revolution of the first signal component about the beam propatagion axis 23.

Because the wave plate 29 causes two revolutions of the polarized light beam 33 for each revolution of the plate 29, the pulse 36 appears during every second revolution of the beam 33 and thus every other time that the plane of polarization is oriented in the predetermined angular direction that serves as the reference direction.

To facilitate a determination of the angular deviation of the vehicle direction from the reference direction of the reference signal and thus of the angular deviation of the display direction equated thereto, the linearly polarized beam 33 is subjected to a modulation treatment during one half of its cycle of rotation about the axis 23. This is accomplished by passing the beam 33 through a light filter to reduce its intensity during the first half cycle of each revolution of the beam 33 about the axis 23. In system 17, this is accomplished by assembling a pair of arcuate light filters 37 on a shaft 38 that is coaxially arranged and fixed for rotation in unison with gear 34 and on a 1:1 basis. The filters 37 when rotating about the axis of shaft 38 are arranged to interrupt the rotating linear light beam 33 as it traverses the path along the axis 33 of propagation for the beam. Each filter is arranged to filter the beam during a quarter cycle of revolution of the shaft 38 and gear 34, and they are symmetrically arranged at diametrically opposite sides of the shaft 38. Here, the arcuate light filters 37 are fixed to and supported on a pair of radially extending segments 37B which are integral extensions of a hub 37A that is concentrically arranged and fixed to the shaft 38, as seen in FIG. 3. Since the beam 33 rotates twice with each revolution of the wave plate and shaft 38, each filter is arranged to filter and thus interrupt the beam 33 during the first half cycle of every other revolution of the beam 33. In this respect, it should be noted (FIG. 3) that the aperture 35 is arranged in alignment with the leading edge 40 of but one of the filters 37 and that an appropriate cutout 41 is provided in this leading edge 40 to facilitate passage of the pulse 26 along the axis 25 of propagation therefore. As such, the light pulse 36 is generated during every other revolution of the beam 33 for reasons which will be more apparent subsequently.

Following its modification by the filter treatment, the modified rotating light beam 33 traverses a beam expanding lens, such as the convex convex lens 42 shown in FIG. 2 that is designed to project the beam into the contemplated area of use. The pulse 36 derived from beam 20 also traverses lens 42 and is also thereby projected into the area of contemplated use. Lens 42 serves as a means for providing a beam 39 (FIG. 4) of light in the contemplated area of use and in which the beam 33 and pulse 36 that provide the reference signal components are provided as separate components of the resulting beam 39.

System 18 provides a means for receiving the reference signal and comparing the current direction of the vehicle 11 with the reference direction indicated by the reference signal. Because the direction of the display 11 is equated to the vehicle direction, system 18 also provides a means for comparing the directional orientation of the display 11 with that contemplated by the reference signal. The system 18 also provides a means for generating an output signal that is indicative of the angular deviation in the object's direction from that indicated by the reference signal.

The system 18 is suitably fixed to and mounted on the vehicle. Its operation is best understood by reference first to FIG. 4 and where it will be seen that the system includes a reference signal receiving and direction comparing system 45, and a signal analyzing and processing system 46 that operates in dependence upon receipt of an optical output signal 47 from the comparing system 45. System 46 serves to provide an output signal 48 that is indicative of the angular deviation in the vehicle 12 and video display 11 directions from that indicated by the reference signal.

System 45 includes an aspheric lens 68 and a narrow band filter 49 that is designed to receive and pass the monochromatic light frequency of the beam 39 and to block the passage of extraneous frequencies. The beam 39 is received by the lens 68 and passed through the filter 49. Thereafter, the beam 39 is received by an optical polarizer 50 that serves as a means for comparing the reference direction indicated by the reference signal with the angular direction of the vehicle 12. The comparative information developed is then delivered from the polarizer 50 and system 45 as an optical output signal designated at 47.

The polarizer's operation and function are best illustrated by reference to FIGS. 5 and 6. First, however, it should be recognized that the components of system 45 are fixed in location with respect to the vehicle 12 and that the desire is to appropriately rotate the display 11 in response to directional rotation of the vehicle. As such, the display 11 and vehicle movements are associated, with the directional movements of the display 11 being linked or equated to and dependent upon the latter directional movements of the vehicle.

Figure 5:
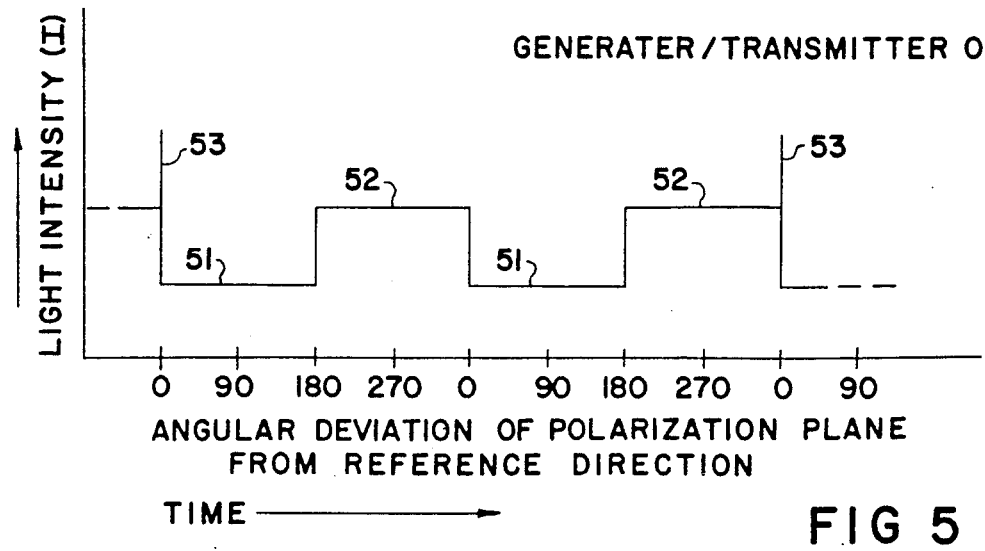
FIG. 5 generally illustrates the output of the generating and transmitting system shown in FIG. 1.

With the above in mind, reference is first made to FIGS. 5. FIG. 5 generally depicts the light intensity (I) of the reference signal carrying beam 39 as received at system 45 and by the polarizer 50, the intensity (I) being shown as a function of time during two complete revolutions of the polarized light beam component of the beam 39. The intensity (I) is also shown as a function of the angular orientation of the polarized light plane with respect to the reference direction determined by the pulse 36. The intensity of the polarized light in beam 39 during the first half of each beam revolution, as when the beam is being modulated by the beam treatment provided by the filter segments 37, is depicted at 51. On the other hand, the unfiltered light intensity of the beam is depicted at 52. The intensifying effect of the the unpolarized light pulse component 36 of the beam 39, is designated at 53 and where it serves to establish the reference direction in the beam. In time of duration, pulse 36 is small compared to that for a complete revolution of the polarized plane. If the plane of polarization and the reference direction at the time of the pulse (See 53) are considered to be true north in the illustration, then the plane of beam polarization is oriented in easterly, southerly and westerly directions, at the respective deviations from the reference direction indicated at 90°, 180° and 270°.

Figure 6:
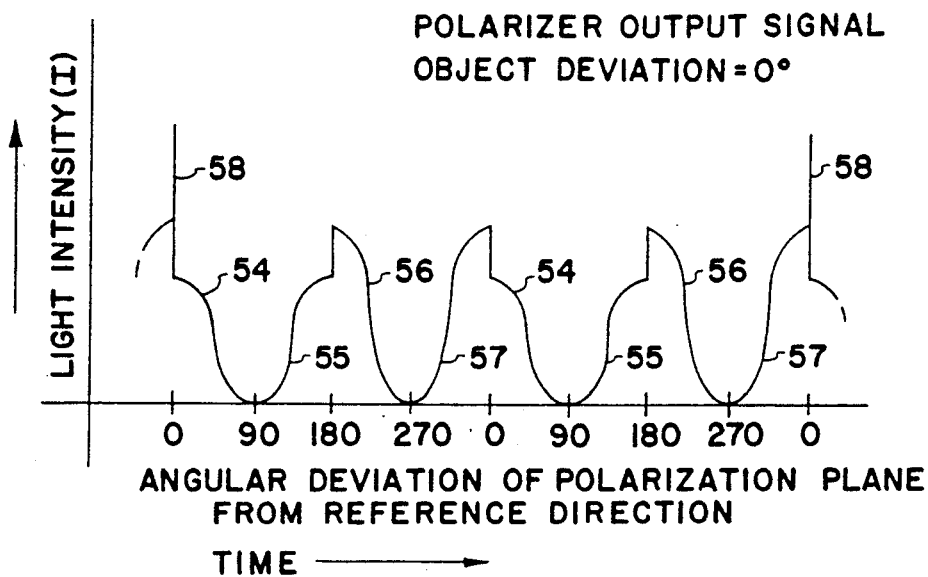
FIG. 6 generally illustrates the optical output of the direction comparator used in the system illustrated in FIG. 4.

FIG. 6 illustrates the optical output signal 47 from the polarizer 50 under circumstances where the vehicle direction coincides with the predetermined northerly reference direction of the reference signal as shown in FIG. 5. Thus, FIG. 6 shows the optical output signal 17 of the polarizer under circumstance where the vehicle direction is north. By comparison with FIG. 5 it shows the effect of the polarizer 50 on the intensity (I) of the beam light transmitted thereby. Thus, the intensity (I) of the transmitted light is shown in FIG. 6 as a function of the time for two revolutions of the polarized beam component. When the reference and vehicle directions coincide, and are oriented in a northerly direction (0°), the polarizer 50 is oriented in a direction such that it passes all of the received light. Thereafter, during the first quarter revolution of the beam 39 from the reference direction, the polarizer 50 progressively reduces the amount of incident beam light that is transmitted, as is shown by the diminishing light intensity (I) at 54 (FIG. 6). During the second quarter revolution of the beam 39 from the reference direction, the polarizer 50 progressively transmits a greater amount of the incident beam light 39, as is shown by the progressive increase in light intensity (I) at 55 (FIG. 6). During the third quarter of the beam revolution, the polarizer 50 again progressively reduces the amount of incident beam light that is transmitted, as is shown at 56, while, during the fourth quarter, the intensity progressive increase, as indicated at 57.

The effect of the polarizer 50 on the incident light of the beam 39 is to provide an optical output signal with a light intensity (I) wave form that is generally sinusoidal in nature but which is modified by an intensity peak 58 that is associated with and provided by the transmission of the unpolarized light pulse 26 that coincides with the orientation of the polarization plane in the northerly reference direction and further modified by the diminished amount of light that is transmitted in the beam 39 during the first half of the wave cycle. Thus, as seen in FIG. 6, the intensity (I) rapidly rises to a peak 58 as the unpolarized light of the pulse 26 is transmitted by the polarizer and thereafter diminishes during the first quarter revolution of each revolution of the beam as the incident polarized light is subjected to the polarizer treatment.

Figure 4:
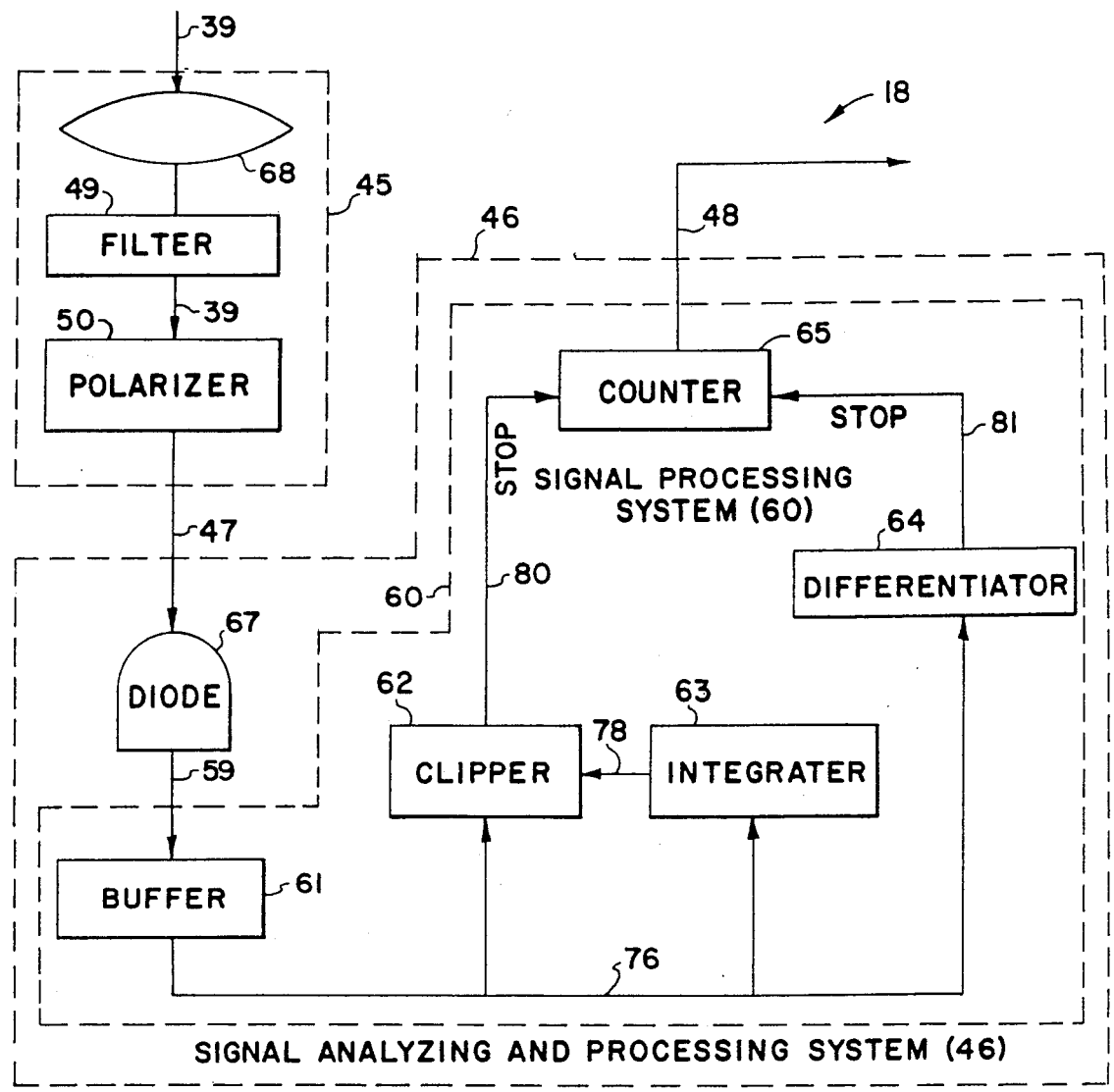
FIG. 4 schematically illustrates the reference signal receiving and processing system used in the embodiment illustrated in FIG. 1.

The optical output signal 47, as delivered from system 45, is detected by a light diode component 67 of the signal analyzing and processing system 46. The electronic signal or output 59 of the diode is delivered to a signal processing system component 60 of system 46. As seen in FIG. 4, this system 60 includes a buffer circuit 61, a clipping circuit 62, an integrating circuit 63, a differentiating circuit 64 and a counter 65, all of which will be considered below.

Figure 7:
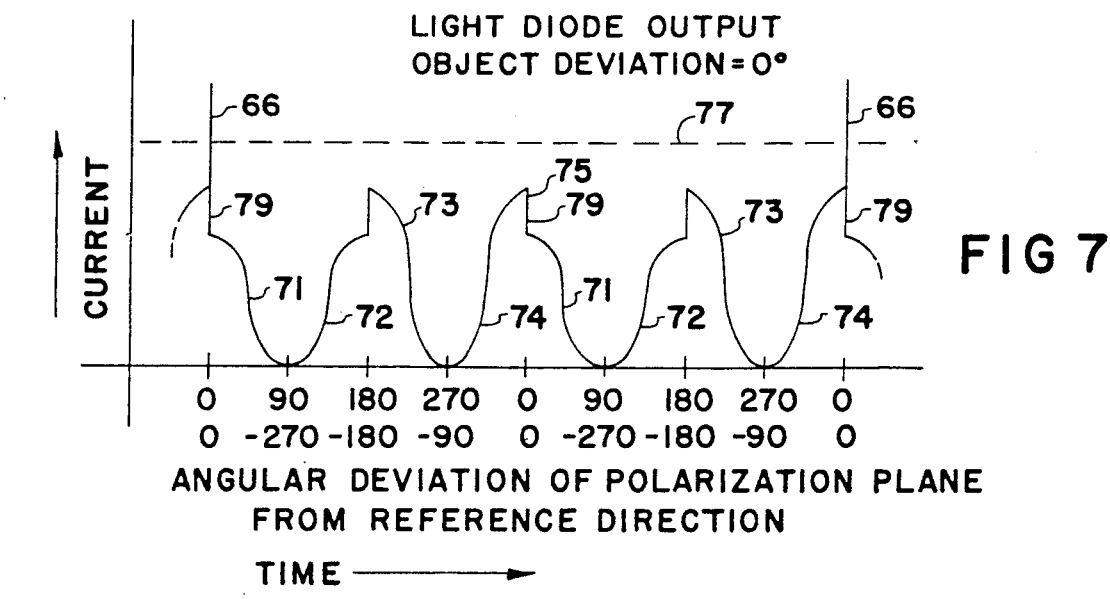
FIG. 7 generally illustrates the electronic output of a light detecting diode used in the system illustrated in FIG. 4, the output illustrated being that developed when the object and reference directions coincide.

In the meantime, reference is made to FIG. 7 and which depicts the light detecting diode output 59 derived from transforming the optical output signal 47 into an electronic signal. FIG. 7 shows the diode output 59 under the same vehicle and reference signal orientations considered in FIGS. 5 and 6 and where the directions coincide. The diode output current in FIG. 7 is shown as a function of time and wherein the current angular deviation of the polarization plane is shown as a parameter.

The current wave form in FIG. 7 is similar to that shown for the light intensity wave form of FIG. 6 and is again a more or less sinusoidal wave form that is modified by the intensity peak component 66 that is associated with the pulse 36 component of beam 39 and with the intensity peak 58 in the optical output signal illustrated in FIG. 6. The wave form is also modified by the light filtration that transpires during the first half of each beam rotation cycle. The light filtration effect is shown by the diminishing current intensity of the sinusoidal wave form at 71 during the first quarter of the each wave cycle when compared to the diminishing current intensity of the wave form at 73 during the third quarters of the cycles. The light filtration effect is also illustrated by comparing the wave forms in the second and fourth quarters of the cycles such as is respectively illustrated at 72 and 74 in FIGS. 7-10.

Figure 8:
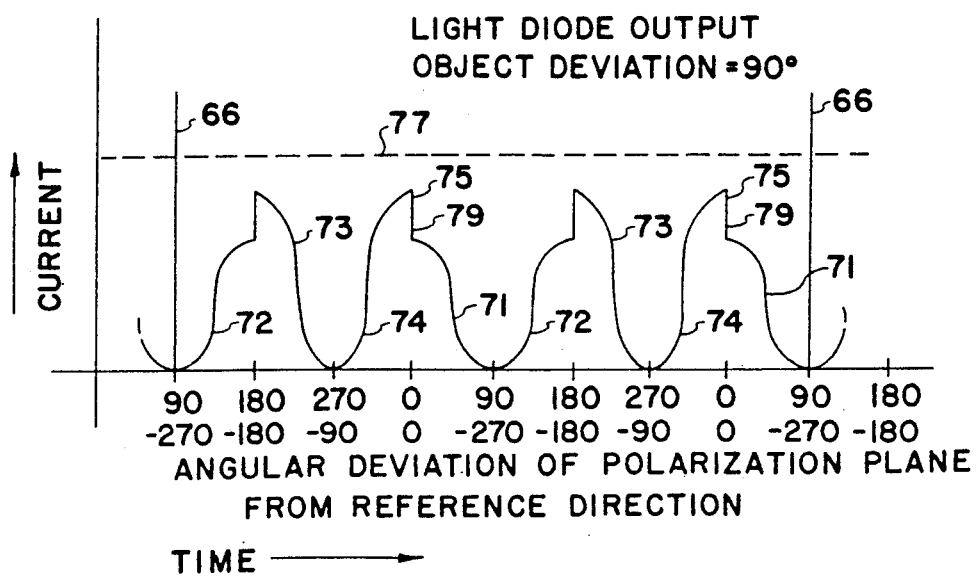
FIG. 8 is similar to that shown in FIG. 7 but illustrates the electronic output of the light detecting diode when the angular deviation between the object and reference directions is 90° (−270°)
Figure 9:
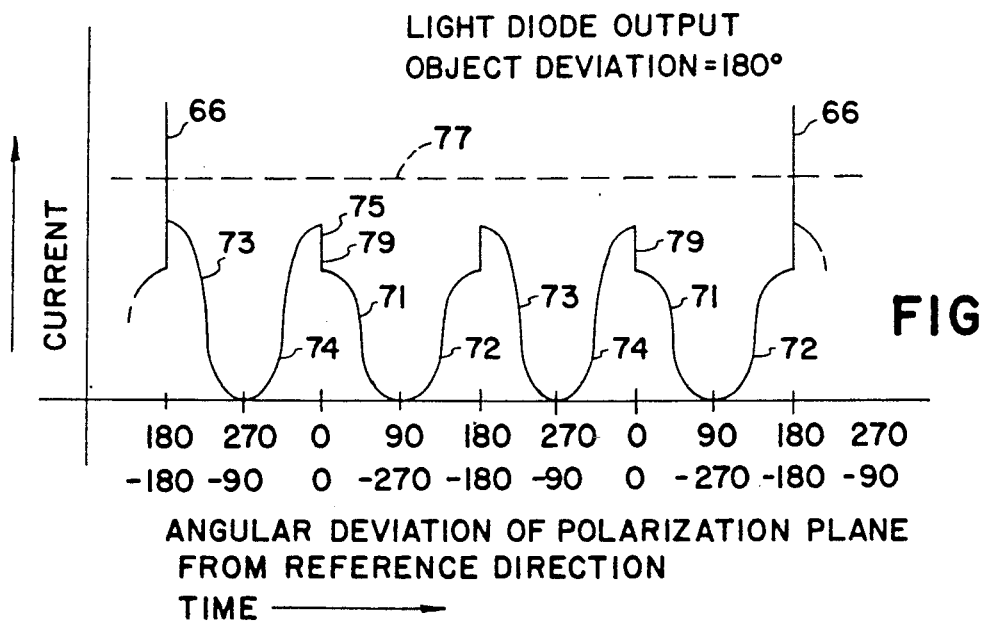
FIG. 9 is similar to that shown in FIG. 7 but illustrates the electronic output of the light detecting diode when the angular deviation between the object and reference directions is 180° (−180°)
Figure 10:
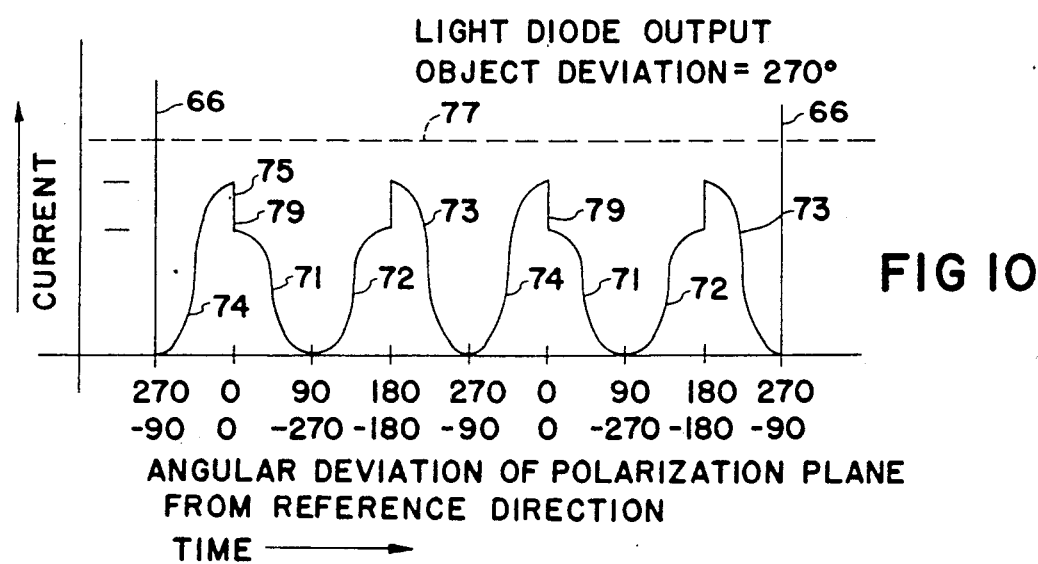
FIG. 10 is similar to that shown in FIG. 7 but illustrates the electronic output of the light detecting diode when the angular deviation between the object and reference directions is 270° (−90°)
Figure 11:
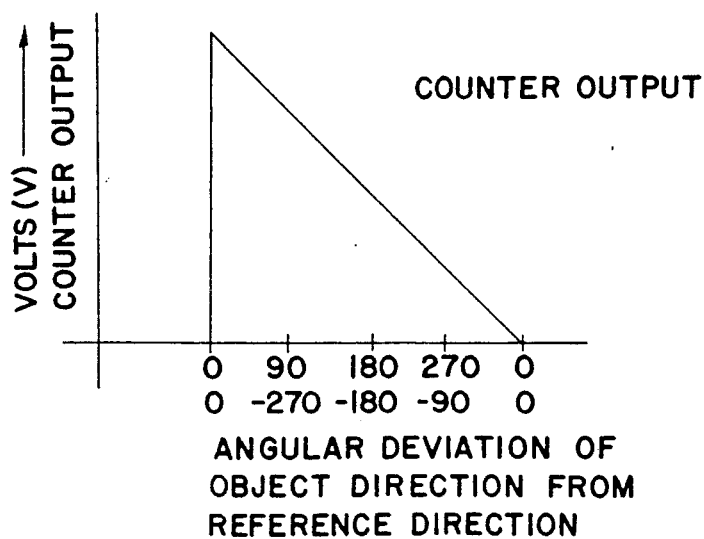
FIG. 11 generally illustrates the output of the reference signal receiving and processing system as a function of the angular deviation between the object and reference directions.

FIGS. 8, 9 and 10 illustrate the wave form of the light diode output in the manner shown in FIG. 7 with the exception that the vehicle 12 is oriented in an easterly, southerly and westerly direction in depicting the respective outputs shown in FIGS. 8, 9 and 10. As illustrated by a comparison of FIGS. 7-10, as the angular deviation between the northerly reference direction and that of the vehicle increases in a positive direction toward the east, the generally sinusoidal wave form that is produced as a consequence of the polarized light transmissions through the polarizer 50 moves to the left (as viewed in the drawings) with respect to the peak outputs 66 that are produced by the unpolarized light pulses 36. This shift is attributable to the different treatments accorded the polarized and unpolarized light components by the polarizer 50 as the first and second components of the reference signal pass through the polarizer 50.

The waveform shift shown in FIGS. 8-10 are also representative of the waveforms developed in analyzing the light intensity waveforms of the polarizer output signal during comparable vehicle orientations with respect to the reference direction. Thus, the light intensity waveform component of the optical output signal illustrated in FIG. 6 and which is attributed to the passage of the polarized first signal component through the polarizer 50 will shift to the left (as viewed in the drawings) with respect to the peak 58 intensity developed by the passage of the unpolarized light pulse 36 through the polarizer.

The light diode 67 (FIG. 4) provides a means for transforming the optical output signal from the polarizer 50 into an electronic signal with time spaced first and second signals that are respectively associated with the objects direction and that of the reference direction. Thus the peak signal 66 illustrated in FIGS. 7-10 is associated with the reference direction, whereas the falling waveform depicted at 75 and which is normally next follows the peak 66 in time can be considered as associated with the vehicle direction. When the reference direction and vehicle coincide, the next following falling waveform transpires during a fractional instant in time following the development of the peak. However, this abnormality may be overcome as indicated below.

The processing of the electronic output signal 59 from the diode 67 transpires in the signal processing system 60. As seen in FIG. 4, the output signal 59 is first passed to a buffer 61 and from which the buffered signal 76 is then delivered in parallel to the clipping, integrating and differentiating circuits 62, 63 and 64. Circuit 62, serves to clip the buffered signal 76 above the peaks attributable to the polarized sinusoidal wave form such for example as illustrated by the broken constant current lines designated at 77 in FIGS. 7-10. The signal 76 is also passed to the integrator 63 and which develops an output 78 that is fed to the clipping circuit 62 for use in optimizing the operation thereof as will be apparent to those skilled in the art. In operation, the clipper 62 generates an output pulse 80 that is associated with the current peaks 66 in the diode output signal 59 and this pulse 80 serves to start the counter 65.

In the differentiator 64, the buffered signal 76 is analyzed for the presence of a sharply falling wave form, such as is encountered at the commencement of the sinusoidal waveforms that are developed during the first half of the rotation of the polarized beam, such sharply falling wave forms being designated at 79. When such a sharply falling wave form is encountered in the signal, a pulse 81 is generated and delivered to the counter.

The counter 65 has a built in time delay before the counter is enabled and the time delay is initiated by reception of the start pulse 80. This time delay is simply long enough to render the output pulse 81 of the differentiator 64 ineffective when the output pulse 81 is delivered simultaneously with the start pulse 80 to the counter 65. In operation, the start pulse 80 enables the counter 65 after the delay and starts the timing process. Thereafter, in the normal operation of the system, the stop pulse 81 is received and the counter is disabled until the next start pulse is received. When the stop pulse 81 is received, counter 65 provides an electronic voltage output signal 48 (FIG. 11) representing the angular deviation between the reference direction and the vehicle direction, as determined at the commencement of the discontinued counting process. This output voltage continues until modified at the end of the next counting process by the voltage output then representing the newly determined angular deviation.

Turning again to FIG. 1 and the system 19 for controlling the directional orientation of the display, the system may include an analog/digital converter 82, and a computer 83. The computer 83 may be a simple inductively programmable computer that is provided with a central processing unit 84, registers 85 and a memory 86 that are appropriately connected to and input/output system 87. In addition there may be an odometer output circuit 88 that provides a suitable digital output signal 89 to the input/output system 87 of the computer 83 in response to distance traversed by the vehicle and a video control circuit 90 for controlling the video display 11 on the vide display device 13.

In operation the reference signal receiving and processing system 18 is responsive to changes in the direction of vehicle movement and feeds the angular deviation output signal 48 to an analog/digital converter 82 that feeds the angular deviation signal to the computer input/output system 87 as a digital signal 90A. Any suitable program for operating the computer 83 may be used in which digital signal 90A fed to the computer is used to control the directional orientation of the display 11. In practice the program for the graphics display 11 will reside in the memory 86 and be constantly addressed as the operating program is carried out. The digital output 89 of circuit 88 may be used to constantly scroll the display 11 downwardly as the vehicle 12 advances by delivering an appropriate signal to the control circuit 90 via lead 91. Similarly a signal indicating the angular deviation of the vehicle may be fed via lead 91 to the display 11 in response to the directions changes made by the vehicle.

It should be pointed out that the angular velocity of the rotating linearly polarized beam should be in excess of the velocity of any angular direction change that will be encountered by usage of the vehicle. This is required to prevent a movement in the negative direction by the vehicle, such as from a northerly direction to a westerly direction, and at a velocity which would exceed the rotational velocity of the first signal component. If such happened, the movement with time, of the sinusoidal wave components attributable to the rotating polarized light beam, would be overcome and thereby provide inaccurately time spaced start and stop signals to the counter.

It may also be pointed out at this point that the rotating linearly polarized light beam may be generated simultaneously with the generation of the polarized beam through imparting suitable rotary motion to the polarizer as the unpolarized beam is being treated thereby.

In the embodiment under consideration, the reference signal generating system 17 should be suspended above the area to be traversed by the vehicle. It may be deployed and rendered operational from a satellite or from an aircraft that is preferably designed to hover over the area of contemplated use of the reference signal. In the instant embodiment, the signal generating and transmission system 17 may be mounted from a tall building in the proximity of the area being traversed by the vehicle and operated along or synchronously with one or more like systems 17 that are appropriately mounted to cover contiguous areas. In internal environments, one or more of the systems 17 may be used to project reference signals into the use area and again if more than one system 17 is used, appropriate provisions should be made to synchronize the output reference signals.

The Shaped Image Embodiment

Reference is made to the embodiment shown in FIGS. 12-26.

FIG. 12 illustrates a system 100 for orienting an object which is shown as a turret component 101 of a self-propelled robot 102. The turret 101 is rotatably mounted on a body component 103 of the robot 102 and is equipped with a pair of arms 104 and 105. The robot 102 is ground supported on wheels 106 that are rotatably driven and suitably manipulated in response to the operation of a computer program as indicated hereinafter.

The general sequence of body movements by the robot about the work area are controlled by the computer program and which is stored in the memory 109 of a computer, designated at 108 and shown in FIG. 12a. In addition to the memory 109, the computer 108 has a central processing unit 110, registers 111 and an input/output system designated at 112.

The computer 108 is located in the body 103 of the robot 102 together with a drive and steering control circuit 113 and a pair of control circuits 114 and 115 for controlling the movements of the left and right arms 104 and 105 respectively. These circuits 113, 114 and 115 are connected to the input/output system 112 by line 116, and lines 117 and 118 that are tapped into line 116, as seen in FIG. 12a.

Also mounted in the body 103 is a signal modifying and switching circuit 119 that is designed to tailor and modify the analog output signal 163 of a reference signal receiving and processing circuit 129 that will be considered subsequently. As will become more apparent, the output signal 163 from system 129 is indicative of the current angular deviation in the turret's direction from the reference direction indicated by the reference signal 128. This signal 163 is delivered to the modifying circuit 119 via a lead 131 connecting with the system 129 and shown in FIG. 12a.

Circuit 119 is designed to modify the analog output signal 163 that is fed to the circuit 119 by lead 131 so as to accommodate the turret directional requirements for forthcoming maneuvers. Such requirements are delivered to the circuit 119 by appropriate signals from the computer input/output system 112 via lead 120 and an analog to digital converter 124 that is interposed in the lead 120. Circuit 119 would normally block passage of the analog output signal 163 to the servomotor 122 until called upon by the computer operating program in response to appropriate signals delivered thereto from the input/output system 112 via lead 120 and converter 124.

Circuit 119 is associated with an amplifier 121 and a servomotor 122 that are also mounted in the body 103 of the robot. These components of the turret control system operate in dependence upon receipt of the angular deviation output signal from system 129 and are used in controlling the angular rotational movements of the turret 101 with respect to the body 102 when the modified output signal is released in accord with the computer operating program. Once released, the modified signal is deliver via lead 132 to the amplifier 121 and thereafter to the servo 122 by way of lead 133. Upon receipt by the servo 122, the motor operates to rotatably move the turret to the direction position dictated by the delivered signal. The servomotor 122 is appropriately mounted in the body and has a gear 123 which engages a circular gear track, not shown, but which is fixed to the inside wall of the hollow turret for providing a drive connection between the motor and turret.

The turret orienting system 100, as seen in FIG. 12 includes a reference signal generating and transmitting system 125 and a suitable signal distribution system 126 that is used for distributing the optical reference signal 128 to all parts of a predetermined work area involved in the robot 102 movements. The system 100 also includes a reference signal receiving and processing system 129 (See FIG. 12A) that is appropriately mounted in the hollow of the turret 101. The hollow turret 101 is mounted for rotational movement about a vertical axis and the top wall of the turret has an aperture 127 through which the optical reference signal 128 is admitted to the turret for reception and processing by system 129.

System 125 is best understood by reference to FIGS. 14 and 15 and serves to generate and transmit a direction indicating reference signal that includes a beam of electromagnetic radiation with a first signal component that rotates at a uniform angular velocity about the axis of propagation of the beam. The reference signal also has a second signal component that is detectable when the first signal component is oriented in a predetermined angular direction, i.e. the reference direction. In this system 125 the electromagnetic radiation is provided in the form of monochromatic and coherent laser light.

The system 125 includes a laser beam generator 135 that serves as a source of coherent monochromatic light and provides a means for generating an unpolarized laser light beam 136. The beam 136 is propagated by the generator 135 along an axis of propagation that is designated at 137. The beam is first expanded in the embodiment by a lens system that includes suitable negative and positive lenses 138 and 139 seen in FIG. 14.

The system 125 includes a light impervious circular mask 140 that is provided with a cutout or aperture 141 with a predetermined configuration. The mask 140 is coaxially mounted along the axis 137 of beam propagation and serves as a means for interrupting the expanded beam and providing a shaped beam with a predetermined image that takes the shape of the aperture 141 seen in FIG. 15.

The mask 140 is mounted in the hollow of an open ended rotatable cylindrical shell component 143 of the system 125 and which is coaxially oriented and supported by a suitable bearing assembly 144 for rotation about the propagation axis 137. The shell 143 has an attached peripheral gear ring 145 that is engaged by a spur gear 146 which is mounted on the shaft of a synchronous motor 147. The arrangement provides a means for rotatably driving the mask 140 at a uniform angular velocity about the axis 137 of propagation and for transmitting the shaped beam 142 in the form of a uniformly rotating image of predetermined shape. This rotating image 148 (See FIG. 18) provides the first signal component of the reference signal 128.

The system 125 also has an optical shutter 149 which is normally open to permit transmission of the beam 142 along the axis 137 and on into the work area for the robot 102. The shutter 149 is connected to a suitable power source by a lead 151 containing a switch 150 that controls the operation of the shutter 149. The switch 150 is operated by a wheel bearing rod 152 that is spring loaded and urged against the perimeter of the shell 143.

When the rod 152 is extended, the power circuit is opened and the shutter is open. The shell 143 has a cam 153 (FIGS. 14 and 15) that is arranged to depress the wheel bearing rod 152 and thereby close the switch 150 when the rotating image 148 formed by the mask 140 is oriented in a predetermined angular direction and which is considered the reference direction. When the switching circuit closes the shutter momentarily interrupts the passage of the beam 142 through the shutter 149 and provides a beam modulation in the form of a beam discontinuity. This discontinuity or interruption in the continuity of the beam serves as the second signal component of the reference signal and, by reference to the rotating direction of the image at the time of the pulse, to also indicate the reference direction of the reference signal. Upon transmission by the shutter 149 the modulated beam bearing the reference signal components is further propagated along the axis 137 and is designated at 134.

A system 126 for distributing the reference signal over a large floor space or work area 154 is depicted in FIG. 16. Provisions are made for projecting the modulated beam 134 beam along a horizontal path 155 that is offset from the underlying floor 154 and located along one side extremity of the work area. To distribute the beam 134 over the work area, appropriate mirrors 156 are distributed along the path 155. Each mirror 156 is arranged to deflect a portion of the beam 134 traversing the path 155 along an auxiliary path that is also horizontal and offset from the underlying floor. These auxiliary paths 159 are normal to path 155 and parallel to each other, and each path 159 is also provided with appropriate mirrors 158 the are spaced apart and oriented to deflect a portion of the beam towards the floor 154. The mirrors 156 and 158 will be understood to be optical mirrors that deflect but a portion of the incident light and transmits the balance of the light to the next mirror. The mirrors at the ends of paths 155 and 159 will, of course, be totally reflective.

In FIG. 12, the robot is seen in conjunction with one of the auxiliary mirrors 158 and the other mirror 159 seen therein is a totally reflective mirror used in orienting the modulated output beam 134 for ultimate passage along the path 155. As seen in FIG. 12, appropriately mounted beneath each of the mirrors 158 seen in FIG. 16 is a diverging lens 130 that serves to spread the beam out beneath the mirror 158 for reception by system 129.

System 129 provides a means for receiving the reference signal 128 and comparing the direction indicated by the signal with the angular direction of the turret 101. The system 129 also provides a means for generating an output signal that is indicative of the angular deviation in the turret's direction from that indicated by the reference signal.

Figure 17:
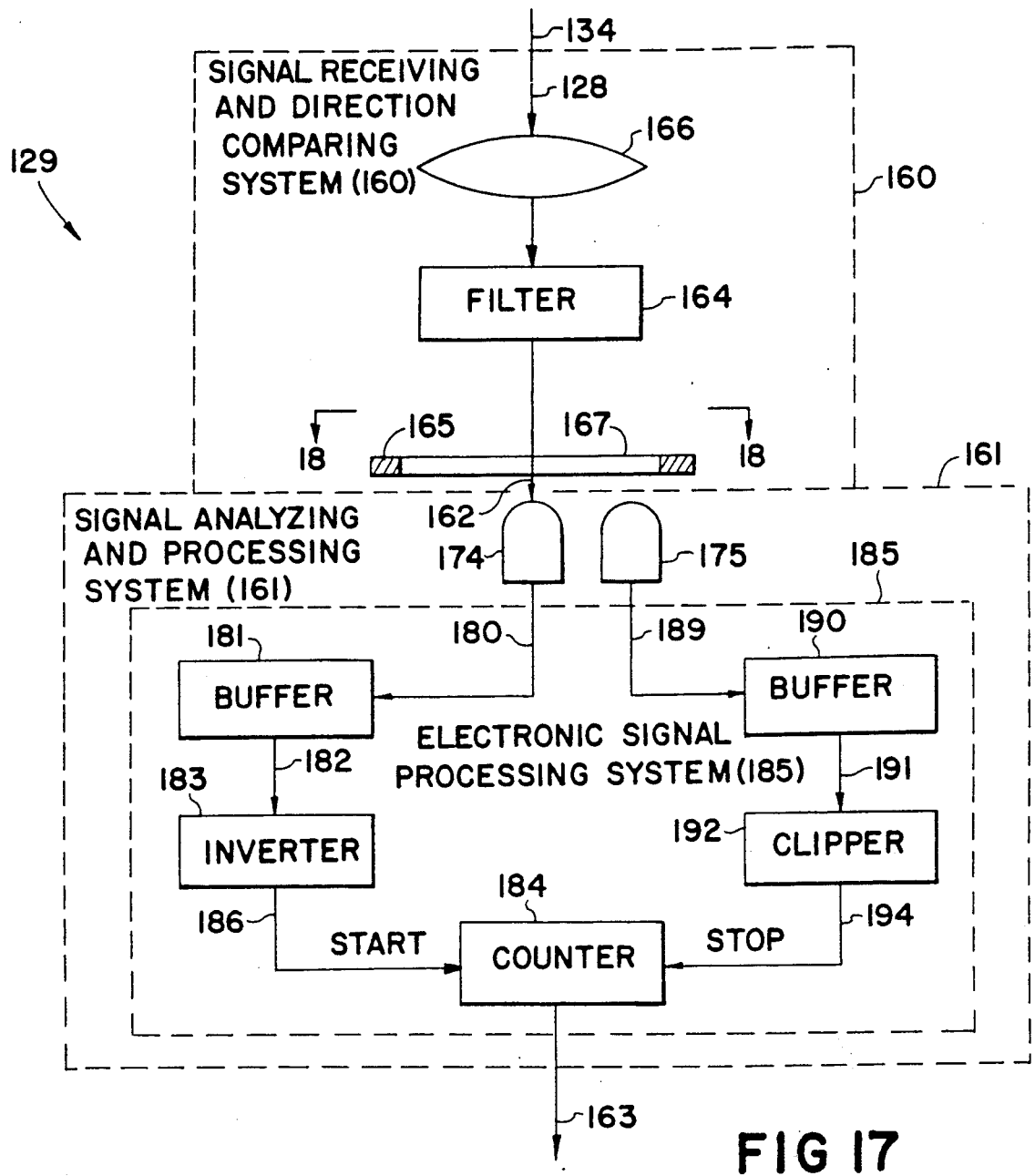
FIG. 17 schematically illustrates the principal components of a reference signal receiving and processing system used in the embodiment illustrated in FIG. 12.
Figure 18:
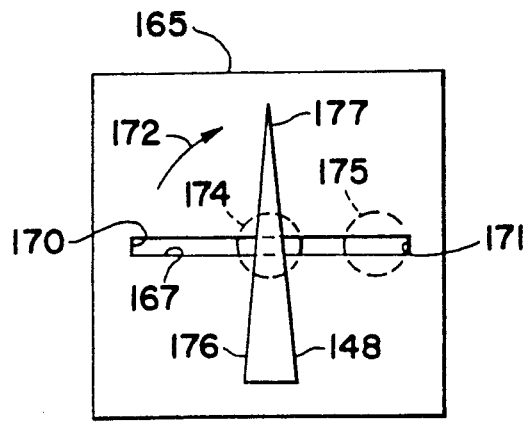
FIG. 18 is a plan view of a light obstructing mask component of a signal receiving and comparing system shown in FIG. 17, the view being taken generally along the lines 18—18 therein and also showing the orientation of a rotating image component of the reference signal.

The system 129 is best understood by reference first to FIGS. 17 and 18. In FIG. 17 it will be seen that the system 129 includes a reference signal receiving and direction comparing system 160 and a signal analyzing and processing system 161 that operates in dependence upon receipt of an output signal 162 from the comparing system 160. System 161 serves to provide an output signal 163 that is indicative of the angular deviation in the turret 101 direction from that indicated by the reference signal 128.

System 160 includes an aspheric lens 166 that receives the beam 134 and passes it to a narrow band filter 164 that is designed to receive and pass the monochromatic light frequency of the modulated beam 134 and to block the passage of extraneous frequencies. After passing the filter 164, the beam 134 encounters a thin light masking plate 165 which is provided with an elongated narrow shaped aperture or slot 167 that is designed for the passage of incident light therethrough. This apertured plate serves as a means for comparing the reference direction indicated by the reference signal 128 of the modulated beam 134 with the angular direction of the turret 101. The comparative information developed by passage of beam 134 through the apertured plate 165 is delivered from the plate 165 and system 160 as an optical output signal designated at 162.

The function of the slotted plate 134 is best illustrated by reference to FIGS. 19 and 20. First, however, it should be recognized that the slotted plate 165 and filter 164 are fixed in location with respect to the turret 101 and underlie the aperture 127 seen in FIG. 13. As such, the arrangement of the slot or aperture 167 with respect to the direction indicated by the image 148 at time of arrival of the pulse indicating the reference direction is indicative of the angular deviation in the turret direction from that of the reference direction.

Figure 19:
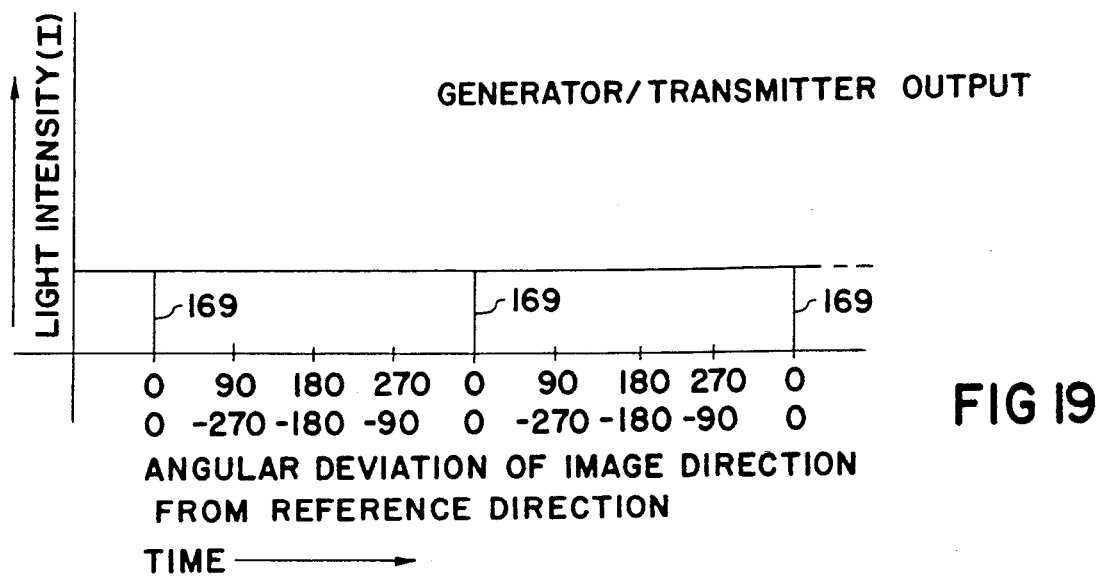
FIG. 19 generally illustrates the output of the generating and transmitting system shown in FIG. 14.

Reference is now made to the FIG. 19 showing of the reference signal generator output signal provided by the modulated beam 134 with the rotating image. FIG. 19 generally illustrates the intensity (I) of the light beam 134 as a function of time and where the negative signal pulses that are generated each time the rotating image 148 arrives at the predetermined reference direction are indicated at 169. The time duration for each pulse is smaller than that required for a complete revolution of the image as is obvious in FIGS. 19 and 20. The deviation of the image direction from the reference direction at any point in time is also provided as a parameter in the illustration. If one assumes that the reference direction at the time of the negative pulses 169 is true north, then the deviation from the reference direction is 90° (−270°) when the image points east, is 180° (−180°) when the image points south and 270° (−90°) when the image points west.

In FIG. 18, the front end 170 of the slot 167 in plate 165 is at the north end of the plate while the rear end 171 of the slot 167 is at the south end of the plate. The image 148 as seen therein is accordingly, currently pointing in an easterly direction as it rotates in the direction of arrow 172.

Figure 20:
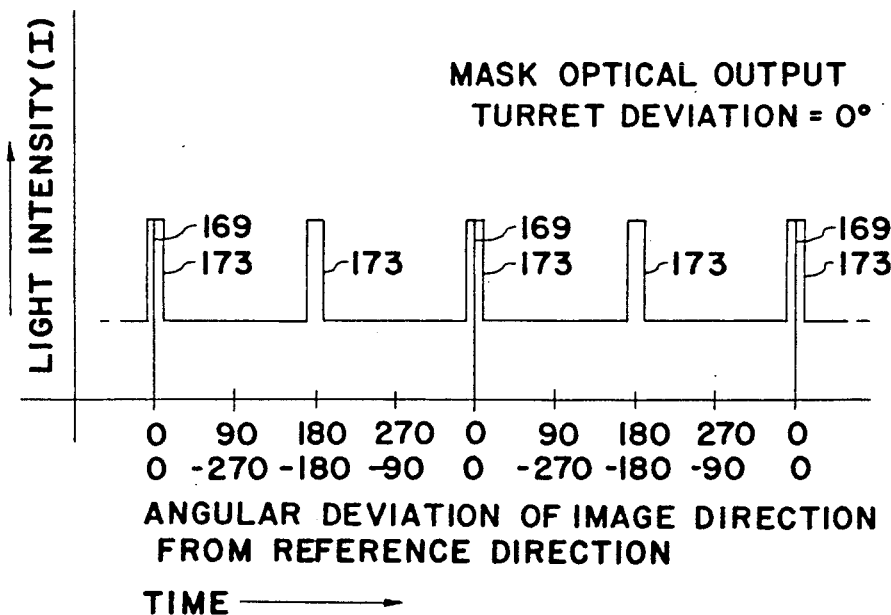
FIG. 20 generally illustrates the optical output signal from the reference signal receiving and processing system illustrated in FIG. 17 and more particularly from the mask component shown therein.

FIG. 20 shows the optical output signal 162 of the slotted plate 165 and of system 160 when the turret direction coincides with that of the northerly reference direction. The intensity (I) of the output is illustrated as a function of time and with the deviation of the image direction from the reference direction being indicated as a parameter.

As the image 148 rotates in the direction of arrow 172, and becomes aligned with the elongated slot 167 a quantum of light passes through the slot 167 and which is basically the same amount regardless of which way the image 148 is oriented in its alignment with the slot. As such, positive going pulses 173 of the same magnitude are shown in the light intensity (I) diagram depicted in FIG. 20 when the image and reference directions coincide, as indicated by an image deviation from the reference direction of 0°, and when they are in opposite directions, as indicated by an image deviation from the reference direction of 180° (−180°). The negative going pulses 169 are of much shorter duration than the positive going pulses 173 and are centered therein when the reference image directions coincide as seen in FIG. 20.

Beneath the slot 167 in plate 165 is a pair of light sensing diodes 174 and 175. See FIGS. 17 and 18. These components of the optical output signal analyzing and processing system 161 are provided for transforming the optical output signal into electronic signal components with time spaced first and second signals that are respectively associated with the turret's direction and that of the reference signal.

Figure 21:
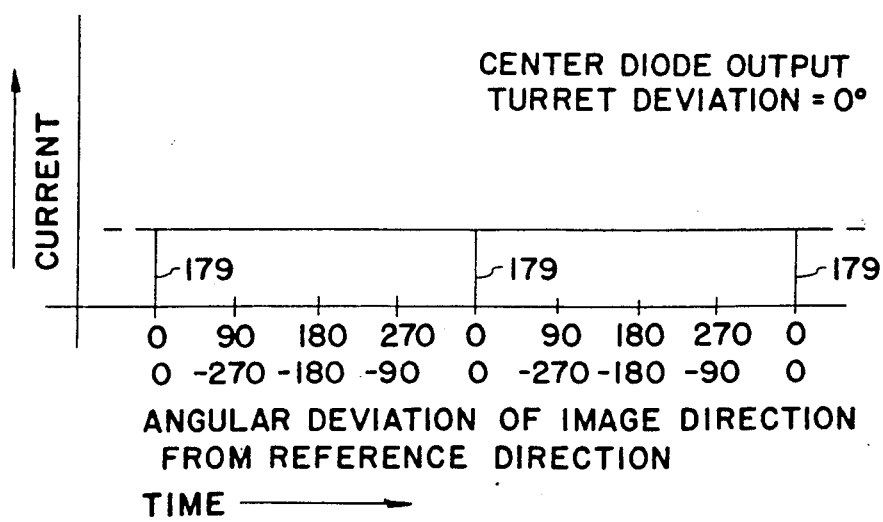
FIG. 21 illustrates the electronic output of one of a pair of light detecting diodes that are used in transforming the optical output signal illustrated in FIG. 20 into a processable signal component.

Diode 174 is located beneath and in close proximity to the slot 167. Furthermore, it is located generally intermediate the opposite ends 170 and 171 of the slot 167 and in general alignment with the axis of rotation of the image 148. Being in alignment with the image 148, it is more or less continuously exposed to the same amount of light as the image 148 rotates about its axis except when the negative going pulse is produced during each revolution and as the image traverses the reference direction. The center diode output is seen in FIG. 21 and where the diode output current is shown as a function of time and with the angular deviation of the image from the reference direction being illustrated as a parameter. As seen in the illustration, the current output is more or less uniform with the negative pulses associated with the reference direction being depicted at 179.

As seen in FIG. 17, the output 180 from the center diode 174 is passed to a buffer 181 and thence as the output 182 of the buffer to an inverter 183. Here, the negative going pulses associated with the reference signal direction are changed to positive going pulses and fed as start pulses 186 to the counter 184 component of the electronic signal processing system 185 of system 161.

The other diode 175 is located beneath and in close proximity to the slot 167 but at the rear end 171 slot location which is offset from the axis of rotation of the image 148. The shape of the image 148, as seen in FIG. 18, is such that the base portion 176 is broader than the apex portion 177. Consequently, a greater quantum of light is transmitted to and detected by diode 175 as the base portion 176 of the image 148 traverses the rear end 171 of the slot 167 during the rotation of the image than when the apex portion traverses the rear end 171 portion of the slot. As such, and by virtue of its location, the rear diode 175 receives a larger quantum of light and for a slightly longer time period as the base 176 of the image rotates by the diode 175 than when the apex portion 177 of the images rotates by the diode 175. This manifests itself into a greater diode current output and for a longer time period, as is evident from a consideration of FIGS. 22–25.

Figure 22:
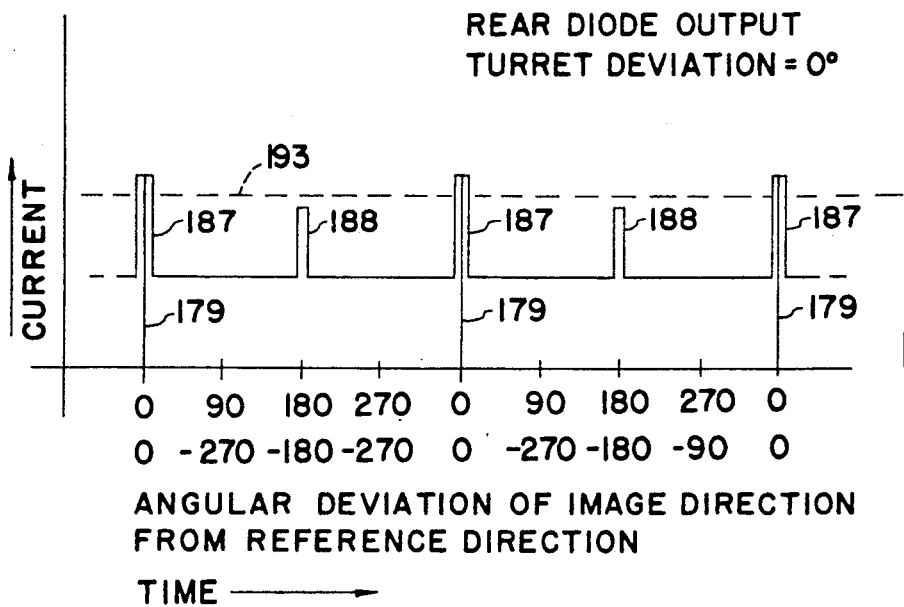
FIG. 22 illustrates the electronic output of the other of the pair of light detecting diodes that are used in transforming the optical output signal illustrated in FIG. 20 into a processable signal component, the view depicting the signal when the turret is oriented in the reference direction indicated by the reference signal.
Figure 23:
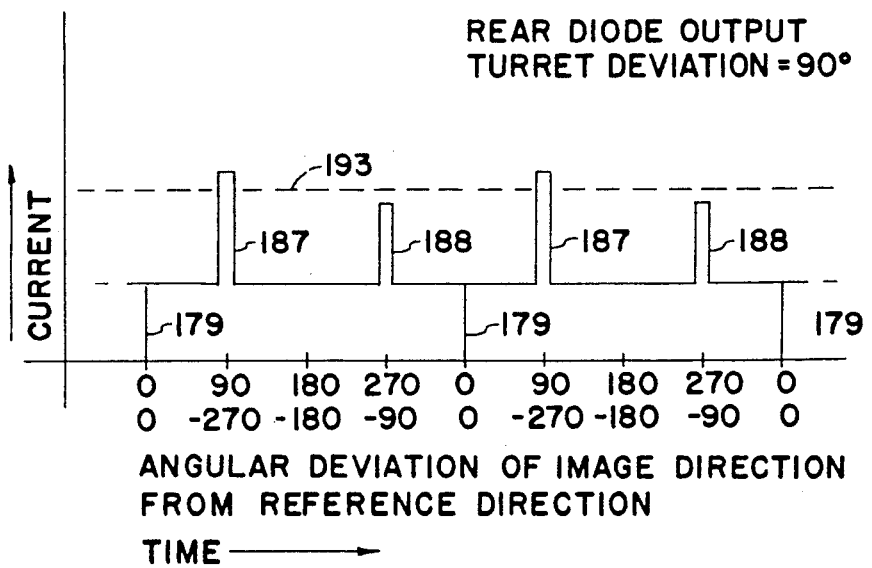
FIG. 23 is similar to that shown in FIG. 22 but illustrates the electronic output of the diode when the angular deviation between the object and reference directions is 90° (−270°)
Figure 24:
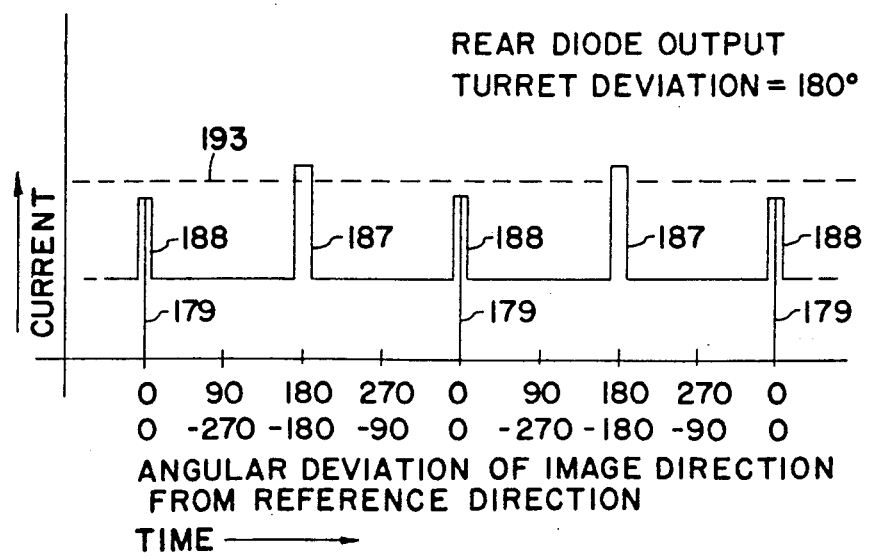
FIG. 24 is similar to that shown in FIG. 22 but illustrates the electronic output of the diode when the angular deviation between the object and reference directions is 180° (−180°)
Figure 25:
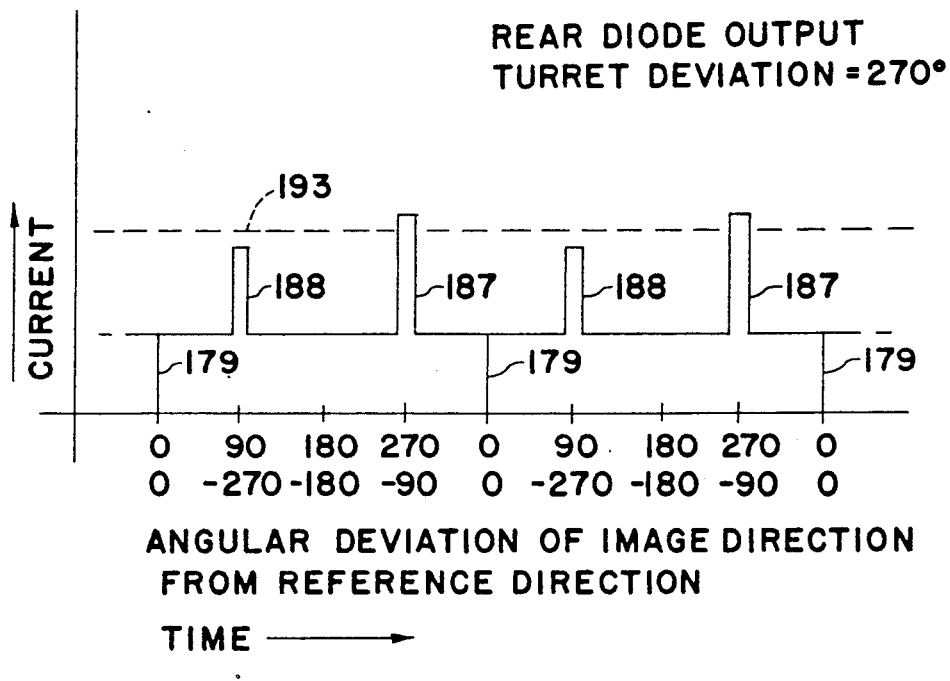
FIG. 25 is similar to that shown in FIG. 22 but illustrates the electronic output of the diode when the angular deviation between the object and reference directions is 270° (−90°)

FIG. 22 illustrates the rear diode 175 output when the turret and reference directions coincide, and shows the current output of the diode as a function of time and with the deviation in the image direction from the reference direction being shown as a parameter. FIGS. 23, 24 and 25 are similar to FIG. 22 except that they depict the rear diode output current when the turret is oriented in easterly, 90° (−270°), southerly 180° (−180°) and westerly 270° (−90°) directions respectively. In these Figures, the pulses developed as the base portion 176 of the image 148 passes over the rear diode 175 are designated at 187 while the pulses developed as the apex portion 177 passes over the rear diode are designated at 188.

A further inspection of FIGS. 22–25 will reveal that as the turret is rotated in the clockwise direction seen in FIG. 18, and thus from its coincidental directional orientation with respect to the reference direction, the time period required for the next pulse 187 increases except under those circumstances where the negative pulse 179 appears during the generation of a positive going pulse 187. This is compensated for by a built in delay to the reception of the stop pulse by the counter as will be seen.

Referring now to FIG. 17, the electronic output 189 from the rear diode 175 is passed to a buffer 190 and then as the buffer output 191 to a clipping circuit 192. Here the signal is clipped, as for example, generally along the lines 193 shown in FIGS. 22–25 to provide the stop pulses 194 that are delivered to the counter 184. The counter 184 is provided with a built in delay to the reception of the stop pulses 194 and which conforms to approximately one-half of the time period required to develop the width of the pulses 187 so as to compensate for the greater time requirement to develop the positive going pulses than the negative going pulses.

The diodes 174 and 175 serve as a light responsive means for transforming the optical output signal 162 into an electronic signal with time spaced signals designated at 187 and 179 and which are respectively associated with the turret's direction and that of the reference signal. The electronic signal processing system 185 not only includes the buffer 181 and inverter 183 used in processing the center diode output 180 for reception by the counter 184 but also the buffer 190 and clipping circuit 192 used in processing the output 189 of the rear diode for reception by the counter 184.

Figure 26:
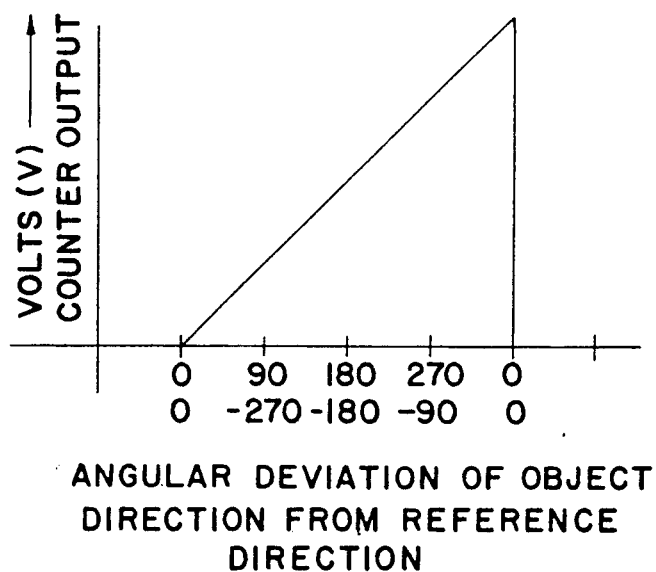
FIG. 26 generally illustrates the output of the reference signal receiving and processing system as a function of the angular deviation between the object and the reference directions.

The counter output is an analog voltage output 163 that is determined during each counting period and maintained until the completion of the next successive counting period. The voltage outputs representing the angular deviation in the turret's direction from that of the reference direction are illustrated in FIG. 26 and wherein the electronic voltage output is set forth as a function of the angular deviation of the turret direction from that of the reference direction.

Reference is again made to FIGS. 12 and 12a. As previously indicated the computer 108 may be provided with an operating program that governs the movements of the robot 102 about the work area 154. For example, the program may contemplate successive movements between a container pickup station and a container delivery station within the work area and where at each station a different angular orientation of the turret is required upon each successive arrival at the station in order to accomplish the container pickup and/or delivery function.

In such situations, the computer may have a delivery and pickup route file located in memory and which is addressed in accord with the operating program for route information each time a pickup or delivery of a container has been accomplished. The information would be copied from memory and released by the computer 108 through lead 116 for operating the drive and power steering control circuits 113 as the robot traverses the programmed route between stations.

Upon arrival, for example, at a pickup station, the operation of the control circuits 113 under the guidance of the route traversal information would be discontinued in accord with the operating program. Thereupon, the operating program would cause the computer to address a file in memory pertaining to the location of the next container to be picked up and withdraw from the pickup station in accord with the operating program. The file would, for example, contain information indicating the precise orientation of the turret with respect to the reference direction, information indicating the precise orientations and movement sequences required by the arms during the pickup maneuver, and information indicating the required adjustments in the robot's location at the station to facilitate the container pickup. In accord with the operating program, the information indicating the turret orientation would be copied from the file and release under the operating program for delivery to circuit 119 via lead 120 and converter 124. The information pertaining to the arm orientations and movement would be copied and similarly released to the arm control circuits 114 and 115 via lead 116 and the leads 117 and 118 tapped thereinto. The information indication the required adjustments in the robot's location would be delivered to circuit 113 via lead 116.

Following the file information transfers to circuit 113, 114, 115 and circuit 119, sequential operation of the circuits under the operating program may first cause the modified signal to be delivered to the servo from circuit 119 to thereby cause movement of the turret to an appropriate angular direction with respect to the reference direction. This would be followed in the sequential circuit operations controlled by the operating program by appropriate orienting movements of each of the arms 104 and 105 to appropriate positions that would facilitate the container pickup approach to be taken by the robot. Thereafter circuit 113 would, in accord with the operating program, be brought into action to cause the robot to adjust its location at the station to facilitate the actual container pickup. The actual pickup and withdrawal of the container from the storage facility at the pickup station would then be caused in accord with the program by appropriate movements of the arms 104 and 105 under the control of circuits 114 and 115 followed by appropriate withdrawal movements under the control of circuit 113.

Once the container has been picked up and withdrawn from storage, the computer would next address the route file and thereupon copy the assigned route to the delivery station and transfer the route information to circuit 113 following which the robot would traverse the route under the control of circuit 113 until arrival at the delivery station.

At the delivery station a similar routine would be followed in accord with the operating program in order to make the delivery of the container. Thereafter similar procedures would be followed in the next container transfer assignment stored in the computer memory, as will be apparent to those skilled in the art.

The Microwave Embodiment

Reference is made to the embodiment shown in FIGS. 27-36.

Figure 27:
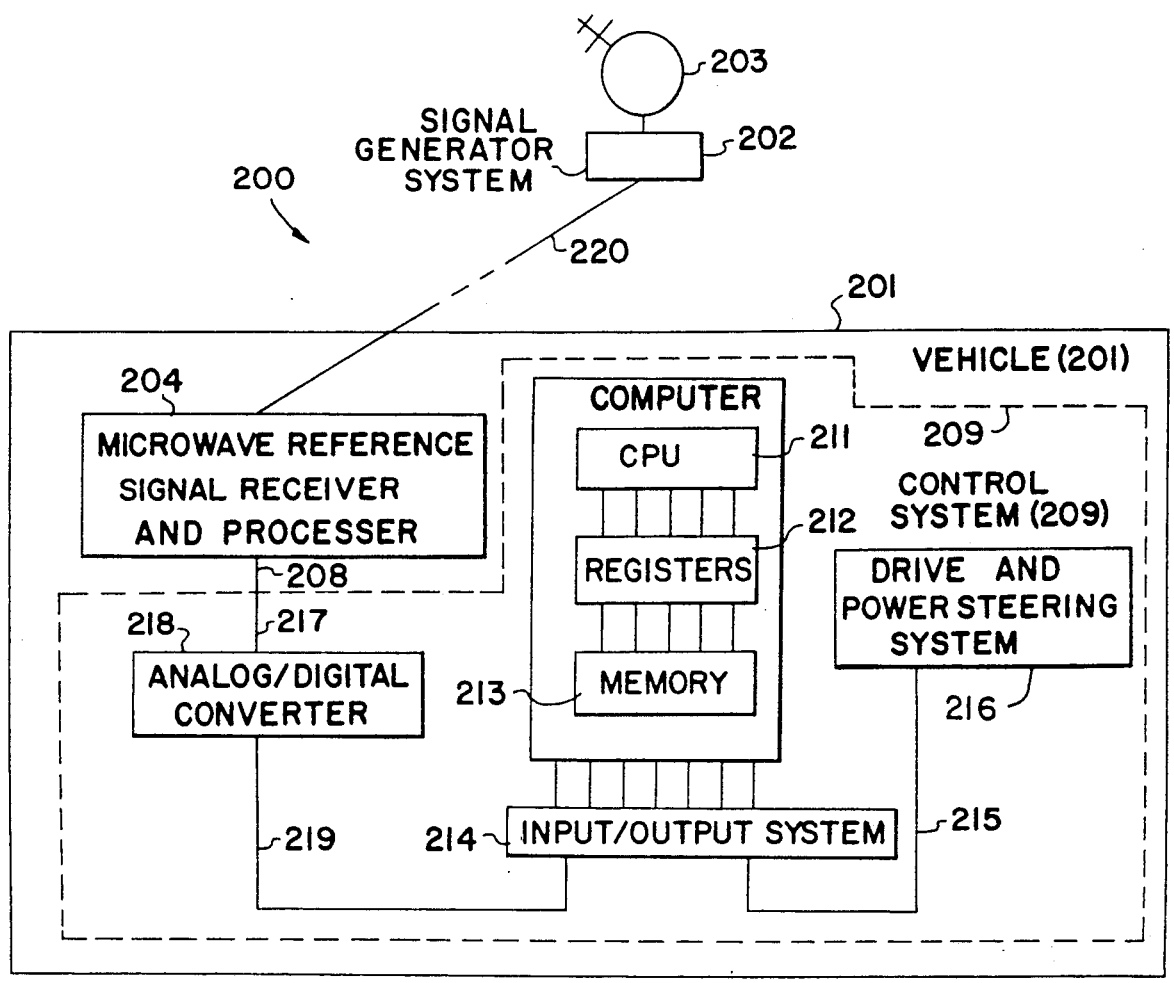
FIG. 27 schematically illustrates a third embodiment of the invention.

FIG. 27 illustrates a system 200 for orienting the direction of movement of a self-propelled ground vehicle 201 under circumstances where substantial changes in environmental conditions would normally interfere with the passage of a light beam bearing a reference signal to a receiver therefor. In this case the reference signal generating and transmitting system 202 may be carried by a satellite 203 located in a fixed orbit and where the reference signal is beamed to a reference signal receiving and processing system 204 that is mounted on and moveable with the vehicle 201.

System 204 has a system 205 for receiving the reference signal and for comparing the reference direction indicated thereby with the direction of the vehicle 201. The system 204 (FIG. 32) also has a system 207 for analyzing and processing the output signal 206 of system 205 and for generating an analog output signal 208 which is indicative of the deviation in the current vehicle direction from that of the reference direction indicated by the reference signal. System 207 operates in dependence upon receipt of the electronic output signal 206 and provisions are made in the system 200 for a control system 209 that operates in dependence upon receipt of the analog output signal 208 for controlling the directional orientation of the vehicle. This output signal 208 is delivered to the control system 209 by a lead 217 connected to an analog/digital converter 218 which is, in turn, connected to the input/output system 214 of the computer by another lead designated at 219.

Control system 209, as seen in FIG. 27 includes a computer 210 with a central processing unit 211, registers 212, a memory 213, and an input/output system 214. The latter is connected by a lead 215 to a power drive and steering system 216 designated at 216.

When an analog output signal 208 is delivered to the converter 218 via lead 217, a digital output is delivered via lead 219 to the input/output system 214 of the computer 210. In accord with the operating program in memory 213, the deviation in the angular orientation of the vehicle from the reference direction at the time of the delivery is compared with the orientation of the vehicle contemplated by the operating program at the time of delivery and a signal is according sent to the drive and power steering system 216 for controlling the directional orientation of the vehicle to that desired in accord with the computer program.

Figure 29:
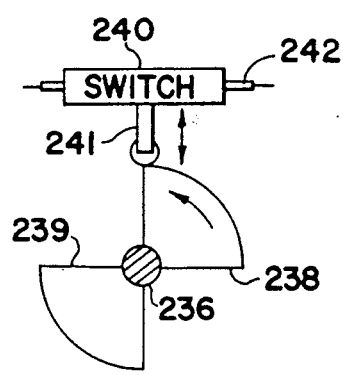
FIG. 29 schematically illustrates in front elevation one of the system components seen in FIG. 28, the view being taken generally along the lines 29—29 in FIG. 28.
Figure 30:
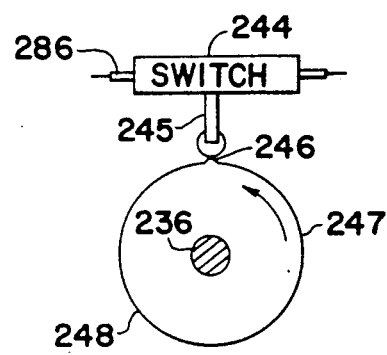
FIG. 30 schematically illustrates in front elevation another of the system components seen in FIG. 28, the view being taken generally along the lines 30—30 in FIG. 28.
Figure 28:
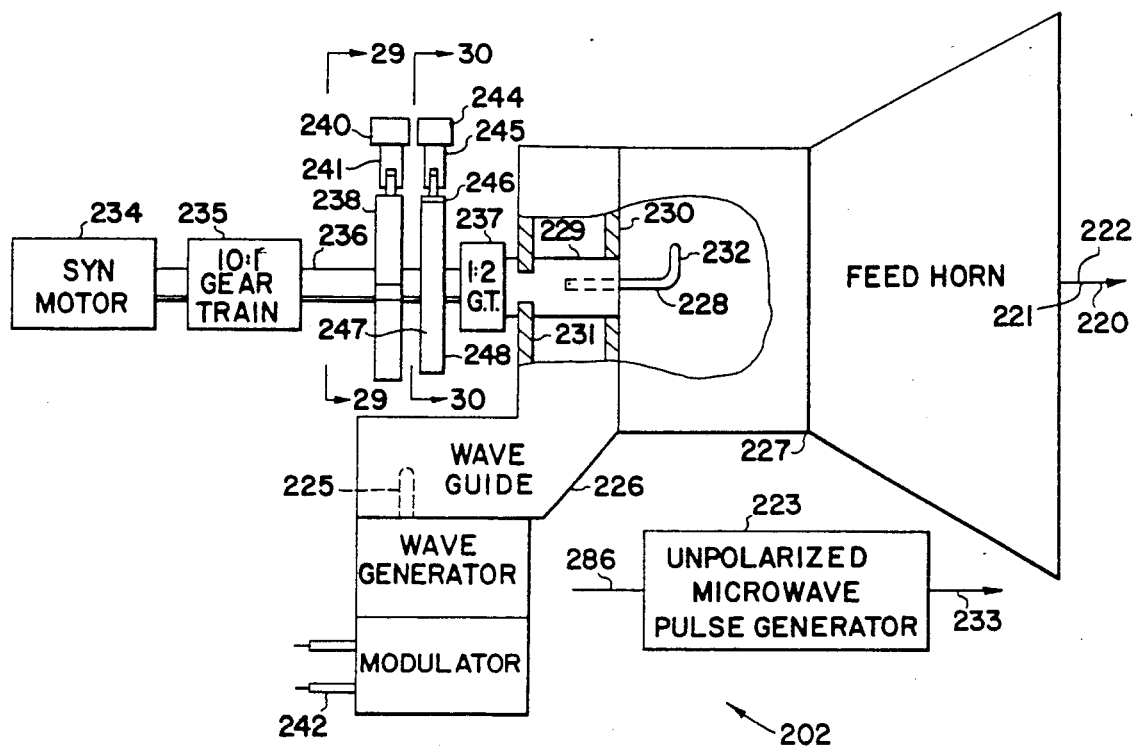
FIG. 28 schematically illustrates a reference signal generating and transmitting system used in the embodiment shown in FIG. 27, certain parts of the illustrated system being broken away to illustrate other parts.

System 202 is best understood by reference to FIGS. 28-30. The system 202 serves to generate and transmit a reference signal 220 into a predetermined area traversed by the vehicle 201. The system 202 includes a beam 221 of electromagnetic radiation with a first signal component that rotates at a uniform angular velocity about the axis 222 of propagation of the beam. The reference signal has a second signal component that is generated by an auxiliary generator designated at 223 and which is detectable when the first signal component is oriented in a predetermined angular direction that will again be referred to as the "reference direction". In this system 202, the electromagnetic radiation is provided in the form of a beam of microwave energy.

The generating and transmitting system 202 includes a microwave generator 224 that is equipped with an output probe 225 which is appropriately positioned as the input probe for a wave guide 226 so as to transmit the generated wave to the guide 226. The wave guide 226 is secured to a microwave feed horn 227 and has an output probe 228 that also serves as an input probe for the horn 227. The probe 228 is provided for coupling the wave guide to the horn 227.

The probe 228 is fixed coaxially in a bore located in one end of a rotatable mounted cylindrical component 229 that is formed from dielectric material. The cylindrical component 229 is suitably mounted for rotational movement in the front and rear walls 230 and 231 of the wave guide 226 and in a coaxial arrangement with the axis 222 of beam propagation, as seen in FIG. 28. The probe 228 extends coaxially into the base of the horn 227 and has a tip end 232 that is arranged normal to the axis of rotation for the probe 228 so that the beam 21 propagated from the horn 227 is a linearly polarized microwave beam and has a plane of polarization that rotates when the probe 228 is caused to rotate.

The generating system 202 includes a synchronous motor 234 which is coupled to a reduction type gear train 235 that has an output shaft 236 which is drivingly connected to yet another gear train 237. The output shaft of gear train 237 is coaxial with and drivingly connected to the cylindrical dielectric component 229 so as to rotatably drive the probe 228 at a uniform angular velocity about the axis of propagation 222 of the beam 221. This arrangement, of course, provides a means for rotating the linearly polarized microwave beam 221 provided at the output probe 228 about the axis 222 of propagation and hence serves to provide the first signal component of the reference signal.

The output shaft 236 has a pair of arcuate segments 238 and 239 (FIG. 29) that are fixed at diametrically opposite sides of the shaft 236. These segments serve as a pair of cams for actuating a switch 240 during the rotational movement of the shaft 236. Each cam is designed to engage a wheel carrying arm 241 of the switch 240 and to depress the arm during a quarter cycle revolution of the shaft 236. When the switch arm 241 is depressed by a cam, it completes a circuit 242 which includes a modulator 243. When the switch 240 is open, the wave generator 224 is exposed to a normal upper level of operating power and when the switch 240 is closed, the power to the wave generator 224 is reduced by a predetermined amount and to a normal lower level of operating power. Because of this the power output of this beam generating system rises and falls in accord with the actuation of the switch 240.

System 202 also has microwave pulse generator 223 which is arranged to provide an output pulse 233 every other time that the polarization plane of beam 221 is oriented in a predetermined direction. This is accomplished by the actuation of switch 244. This pulse serves as the second signal component of the reference system. Switch 244 is located next to switch 240 and it also has a depressible wheel carrying switch arm 245. The switch arm 245 is actuated by encounter with a cam surface 246 (FIG. 30) that is provided on a circumferential surface 247 of a narrow cylindrical component 248 that is coaxially arranged and fixed to the output shaft 236 of the gear train 235. When the switch arm 245 is depressed, a circuit 286 that includes the pulse generator 223 is completed and a microwave pulse 233 is generated and propagated along an axis parallel to axis 222. The pulse generator 223 provides an output pulse 233 which together with the rotating beam 221 make up the reference signal 220. The arrangement of cams 238 and 246 is such, as seen in FIGS. 29 and 30, that the pulse 233 caused by the actuation of switch 244 comes, in time, simultaneously with the actuation of switch 240.

It should be noted that the probe 228 rotates two revolutions for each revolution made by shaft 238 for reasons of gear train 237 and that, as a consequence, the plane of polarization of the beam 221 revolves about the axis 222 twice during each revolution of the shaft 236. Because of this arrangement, the microwave pulse 233 transpire every other revolution of the beam 221. These pulses serving to provide the second signal component of the reference signal establish the reference direction in relation to the direction of the plane of polarization at the time of the surge. They are small in time duration when compared to the time required for a complete rotation of the polarized microwave beam.

It should also be noted that each of the cams 238 and 239 associated with switch 240 is designed to provide a power reduction during a quarter cycle revolution of shaft 236 and which, because of the gear train 237, provides a reduction in the power of the rotating beam 221 during what may be considered the first half of each cycle of wave rotation. Furthermore, it should be noted that switch 244 is actuated to create a microwave pulse at the commencement of a power reduction for reasons of the simultaneous actuation of the switches 240 and 244 by cams 238 and 246 respectively.

This the reference signal receiving and processing system 204 includes the system 205 (FIG. 32) for receiving the reference signal and for comparing the direction indicated by the signal with the current direction of the vehicle 201. It also includes the system 207 (FIG. 32) for analyzing and processing the output signal 206 of the comparing system 205 and for generating the analog output signal 208. System 207 has a heterodyne system 249 for transforming the microwave signal output 206 of the microwave receiver horn into an electronic signal 261 with respective signal components associated with the reference direction and the vehicle direction. The system 207 also has a system 259 for processing the electronic signal 261 and generating an analog output 208.

Figure 31:
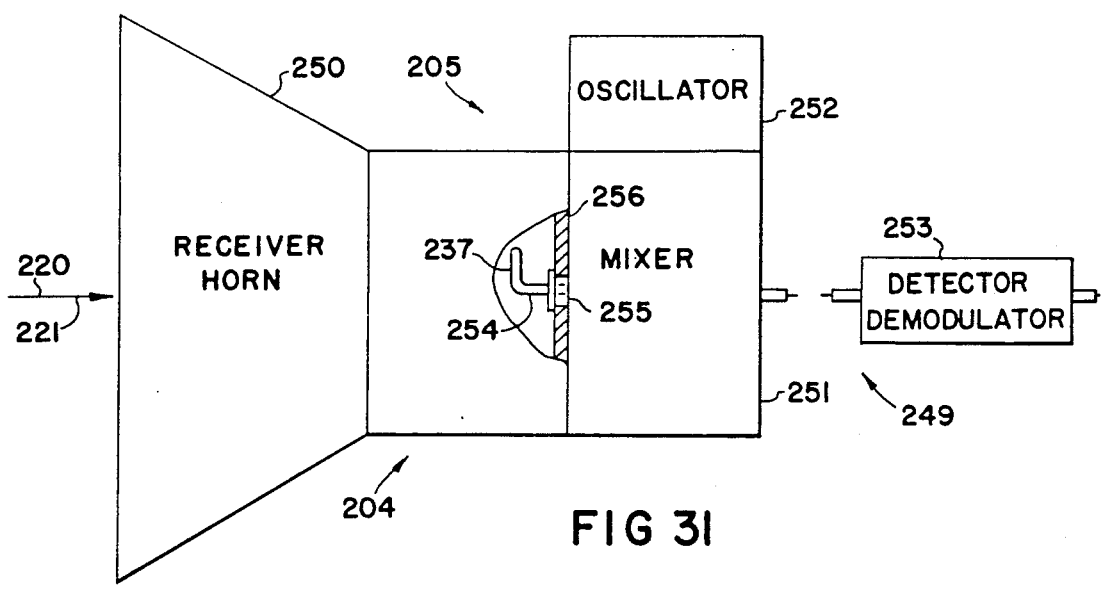
FIG. 31 schematically illustrates certain components of a reference signal receiving and processing system used in the embodiment illustrated in FIG. 27.
Figure 32:
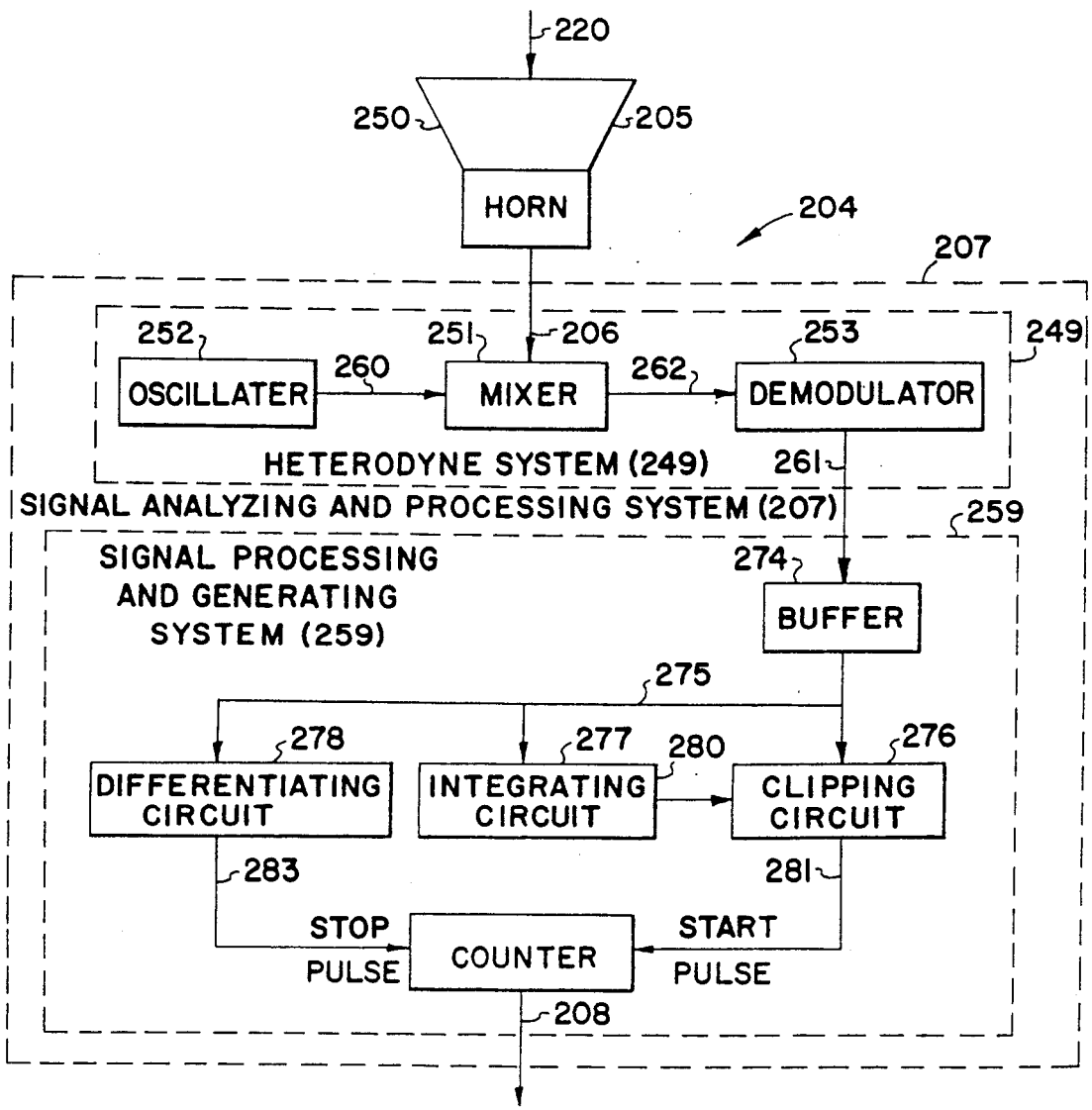
FIG. 32 diagramatically illustrates the components of a reference signal receiving and signal direction comparing system provided by the components illustrated in FIG. 31 and further diagrammatically illustrates a signal processing system used in conjunction therewith for generating an output signal indicative of the deviation in the vehicle direction from that of the reference direction.

The receiving and comparing system 205 is best understood by reference to FIGS. 31 and 32 and wherein the principal components of the system 205 are seen as including a microwave signal receiving horn 250 and a probe 254. The horn 250 is coupled by the probe 254 to the mixer 251 of the heterodyne system 249.

The probe 254 is fixed to and coaxially mounted in a cylindrical dielectric component 255 that is, in turn, fixed to and coaxially mounted in the rear wall 256 of the horn 204. The probe 254 communicates with both the horn 250 and mixer 251 along the axis of the horn, the probe 254 is provided with an end portion 237 that is bent normal to the general axis for mounting the probe 254. The horn is fixed to the vehicle and appropriately arranged to receive the reference signal 220. The arrangement of the end portion 237 is such on treating the reference signal as to indicate and establish the vehicle direction in the output 206 to the heterodyne system 249.

Figure 33:
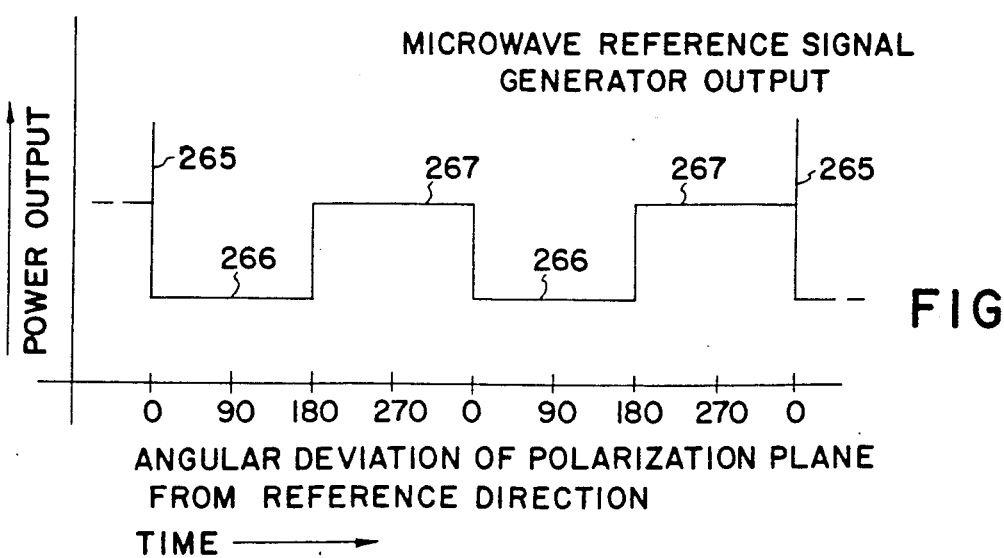
FIG. 33 illustrates the output power generated by the reference signal generating and transmitting system shown in FIG. 28.

The operation of the system 205 is best understood by first referring to FIG. 33 and which illustrates the output of the reference signal generating and transmitting system 202. The illustration shows the output signal 220 during two consecutive revolutions of the microwave beam and in terms of the generator output power (P) as a function of time, the angle of deviation of the plane of polarization from the reference direction being shown as a parameter. The power peaks shown at 265 constitute the second signal component of the reference signal and coincide in time with the polarized plane direction that indicates the reference direction. As seen in FIG. 33 the peaks appear every other complete revolution of the polarization plane. The normal lower level power outputs during the first half of each revolution of the microwave beam are designated at 266 and the normal higher level power outputs during the second half of each revolution of the microwave beam are designated at 267. The waveform is similar to the waveform developed by the reference signal generator shown in the first embodiment.

The content of the microwave output signal 206 is best understood by considering the demodulated waveform of the signal 206 after its treatment in the heterodyne system 249. In this respect and in addition to the mixer 251, the heterodyne system 249 also has an oscillator 252 and demodulator 253. It serves to process the output signal 206 from the horn 250 and to provide an electronic signal 261 with components that are respectively associated with the reference signal direction and the direction of the vehicle.

As shown in FIG. 32, the reference signal 220 is received by the horn 250 and, for reasons of the probe orientation, compared with the vehicle direction and modified to provide the output signal 206 that is transmitted to the mixer 251. The output 260 of the oscillator 252 is fed to the mixer 251 to modulate the reference signal input 206 to the mixer and provide a beat frequency output 262 that includes the reference and oscillator output signals. The modulated reference signal 262 is then fed to the demodulator 253 for removal of the oscillator signal and the passage of the modified reference signal as the output signal of the system 261. The shape of this output signal 261 of the demodulator 253 is indicative of the microwave receiver horn output signal 206.

Figure 34:
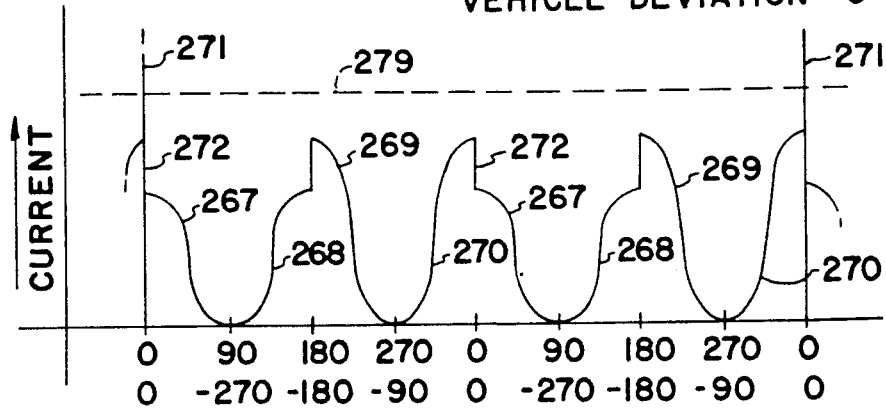
FIG. 34 illustrates the signal output of a reference signal receiving and object direction comparing system illustrated in FIG. 32 and as seen when the direction of the vehicle coincides with that of the reference direction contemplated by the reference signal.

Reference is now made to FIG. 34 and where the current output of the demodulator 253 is shown as a function of time and with the angular deviation of the reference direction from that of the vehicle direction being shown as a parameter. The waveform shown is that generated when the vehicle direction and reference directions coincide. As seen therein, the arrangement of the probe 254 is such as to provide a demodulator output 261 with a low level generally sinusoidal type waveform during the first half cycle of each revolution of the microwave polarization plane and with a high level generally sinusoidal type waveform during the second half cycle of each revolution. The arrangement is similar to that shown in FIG. 7. Thus, during the first quarter of the wave plane revolution, the modulator output current diminishes, as seen at 267 in the low level waveform. During the second quarter of the wave plane revolution, the modulator output current increases, as seen at 268 in the low level waveform. Similar dimishments and increases occur in the third and fourth quarters of the cyclic movements of the polarized microwave plane as seen at 269 and 270 of the high level waveform.

The effect of the pulse 233 at the commencement of the planar rotation cycle is seen at 271 and where the current pulse provided exceeds the magnitude of the current generated during the normal high and low power levels involved in the makeup of the wave components.

Figure 35:
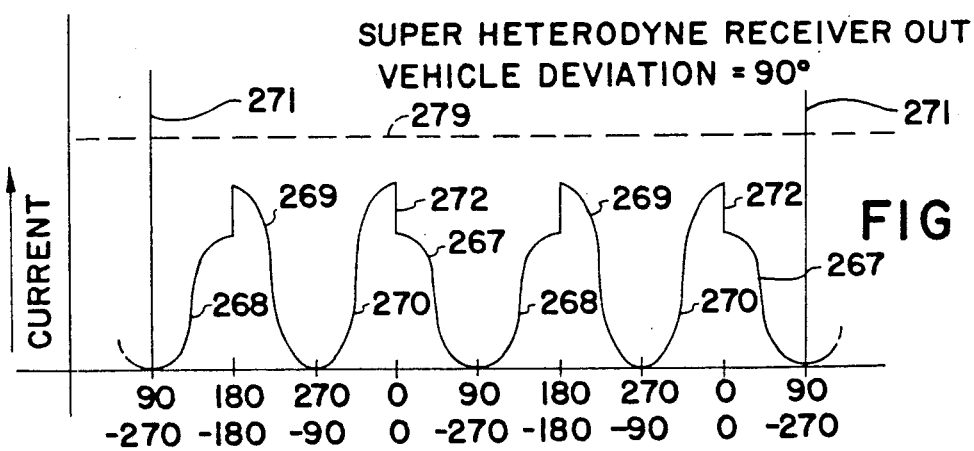
FIG. 35 is similar to FIG. 34 but as seen when the deviation between the direction of the vehicle and the reference direction of the reference signal is 90° (−270°)
Figure 36:
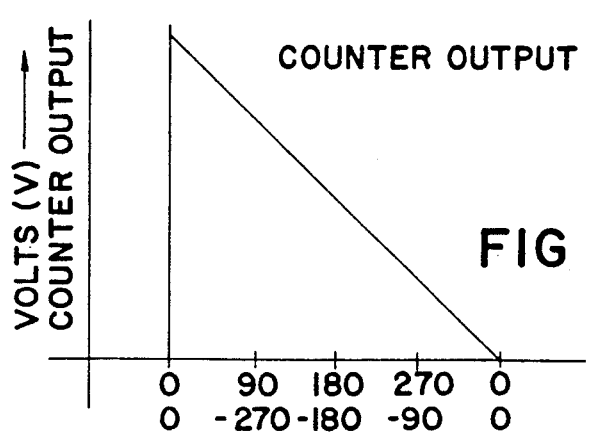
FIG. 36 illustrates the analog output of the counter as a function of the angular deviation in the direction of the vehicle from the reference direction indicated by the reference signal.

Reference is now made to FIG. 35 and where the demodulator output current is depicted under circumstance where the vehicle 201 is oriented in an easterly direction, 90° (−270°), in comparison to the northerly reference direction. As seen therein and like the changes indicated in the first embodiment, the clockwise rotation of the vehicle direction with respect to the reference direction has the effect of moving the sinusoidal type waveforms to the left, as seen in FIG. 35, with respect to the surge peaks 271.

The heterodyne system 249 provides a means for transforming the microwave output 206 from the horn 250 into an electronic signal with time space first and second signals that are respectively associated with the vehicle direction and that of the reference direction. Thus the peak signals illustrated at 271 in FIGS. 34 and 35 are associated with the reference direction whereas the falling wave form depicted at 272 and which normally next follow the peak 271 in time can be considered as associated with the vehicle direction. When the reference direction and vehicle directions coincide, the next following sharply falling waveform transpires during a fractional instant in time following the development of the peak 271. However, this abnormality can be overcome in a manner similar to the solution to the problem as encountered in the first embodiment and as indicated below.

The processing of the electronic output signal 206 from the heterodyne system 205 transpires in the signal processing system 259. As seen in FIG. 32, the electronic output signal 261 is first passed to a buffer 274 and from which the buffered signal 275 is then delivered in parallel to clipping, integrating and differentiating circuits designated at 276, 277 and 278 respectively. Circuit 276 serves to clip the buffered signal 275 above the peaks attributable to the polarized sinusoidal wave form, such for example as illustrated by the broken constant current lines designated at 279 in FIGS. 34 and 35. The signal 261 is also passed to the integrator 277 and which develops an output 280 that is fed to the clipping circuit 276 for use in optimizing the operation thereof as will be apparent to those skilled in the art. In operation, the clipper 276 generates an output pulse 281 that is associated with the current peaks 271 in the demodulator output signal 261 and which serves to start the counter 282.

In the differentiator 278, the buffered signal 275 is analyzed for the presence of a sharply falling wave form, such as is encountered at the commencement of the sinusoidal type waveforms that are developed during the first half of the rotation cycle of the polarized microwave beam, such sharply falling wave forms being designated at 272. When such a sharply falling wave form is encountered in the signal, a stop pulse 283 is delivered to the counter 282.

The counter has a built in time delay before the counter is enabled by the start pulse 281 and the time delay is initiated by reception of the start pulse. This time delay is simply long enough to render the stop pulse 283 of the differentiator 278 ineffective when the stop pulse 283 is delivered simultaneous with the start pulse 281 to the counter. In operation, the start pulse 281 enables the counter 282 and starts the timing process. Thereafter in the normal course of event, the stop pulse 283 is received and the counter disabled until the next start pulse arrives. When the stop pulse 283 is received, counter 282 provides a voltage output signal 206 (FIG. 36) representing the angular deviation between the reference direction and vehicle direction, as determined at the commencement of the discontinued counting process. This continues until modified at the end of the next counting process by the voltage output representing the newly determined angular deviation.

While preferred embodiments of this invention have been shown and described by way of illustration, many modifications will occur to those skilled in the art and it is, therefore, desired w that it be understood that it is intended herein to cover all such modifications as fall within the true spirit and scope of the invention.

What is claimed as new and what it is desired to secure by Letters Patent of the United States is set forth below.

We claim:

1. A system for orienting the direction of a first object comprising
   (A) means for generating a reference direction indicating reference signal that includes
      a laser light beam with a first signal component that rotates at a uniform angular velocity about the axis of propagation of the beam and
      a second signal component that is detectable when the first signal component is oriented in a predetermined angular direction that constitutes said reference direction, said second signal component having a time duration that is small in comparison to the time required for a complete revolution of said first signal component about said axis, (B) means for receiving the reference signal and comparing said reference direction with the direction of said first object or with the direction of a second object that is equated in directional orientation thereto, said reference signal receiving and comparing means having an optical output signal that is indicative of the angular deviation between the compared directions, (C) means operating in dependence upon receipt of said optical output signal for analyzing said optical output signal and generating an electronic output signal that is indicative of said angular deviation, and (D) means operating in dependence upon receipt of said electronic output signal for controlling the directional orientation of said first object.

2. A system in accordance with claim 1 wherein said reference signal generating means comprises
    (A-1) means for generating a linearly polarized laser light beam and propagating it along said axis of propagation.

3. A system in accordance with claim 1 wherein said reference signal generating means comprises
    (A-1) means for generating an unpolarized laser light beam and propagating it along said axis of propagation, and
    (A-2) means for linearly polarizing at least a portion of the unpolarized laser light beam.

4. A system in accordance with claim 1 wherein said reference signal generating means comprises
    (A-1) means for generating a linearly polarized laser light beam and propagating it along said axis of propagation, and
    (A-2) means for rotating the linearly polarized laser light beam about said axis of propagation, and
said rotating linearly polarized laser light beam has a rotating plane of polarization that constitutes said first signal component.

5. A system in accordance with claim 1 wherein said reference signal generating means comprises
    (A-1) means for generating a linearly polarized laser light beam and propagating it along said axis of propagation, and
    (A-2) means for rotating the linearly polarized laser light beam about said axis of propagation,
said rotating linearly polarized laser light beam has a rotating plane of polarization that constitutes said first signal component, and
said reference signal generating means further comprises
    (A-3) means for generating said second signal component when said rotating plane of polarization is oriented in said predetermined angular direction.

6. A system in accordance with claim 1 wherein said reference signal generating means comprises
    (A-1) means for generating a linearly polarized laser light beam and propagating it along said axis of propagation, and
    (A-2) means for rotating the linearly polarized laser light beam about said axis of propagation,
said rotating linearly polarized laser light beam has a rotating plane of polarization that constitutes said first signal component, and
said linearly polarized laser light beam rotating means comprises
    (A-2-a) a half-wave plate arranged along said axis of propagation to receive and transmit the linearly polarized laser light beam, and
    (A-2-b) means for rotatably driving said half-wave plate at a uniform angular velocity about said axis of propagation.

7. A system in accordance with claim 1 wherein said reference signal generating means comprises
    (A-1) means for generating a linearly polarized laser light beam and propagating it along said axis of propagation, and
    (A-2) means for rotating the linearly polarized laser light beam about said axis of propagation,
said rotating linearly polarized laser light beam has a rotating plane of polarization that constitutes said first signal component,
said linearly polarized laser light beam rotating means comprises
    (A-2-a) a half-wave plate arranged along said axis of propagation to receive and transmit the linearly polarized laser light beam, and
    (A-2-b) means for rotatably driving said half-wave plate at a uniform angular velocity about said axis of propagation, and
said reference signal generating means further comprises
    (A-3) means for generating said second signal component when said rotating plane of polarization is oriented in said predetermined angular direction.

8. A system in accordance with claim 1 wherein said reference signal generating means comprises
    (A-1) means for generating an unpolarized laser light beam and propagating it along said axis of propagation, and
    (A-2) means for linearly polarizing at least a portion of the unpolarized laser light beam, and
    (A-3) means for rotating the linearly polarized laser light beam about said axis of propagation,
said rotating linearly polarized laser light beam has a rotating plane of polarization that constitutes said first signal component,
said reference signal generating means further comprises
    (A-4) means for generating said second signal component when said rotating plane of polarization is oriented in said predetermined angular direction, and
said reference signal generating means further comprises
    (A-4-a) means for deflecting a portion of the unpolarized laser light beam along an auxiliary axis of propagation therefore, and
    (A-4-b) means interrupting the unpolarized laser light beam portion along said auxiliary axis of propagation and releasing a light pulse from the interrupted unpolarized laser light beam for propagation along said auxiliary axis when said rotating plane of polarization is oriented in said predetermined direction.

9. A system in accordance with claim 1 wherein said reference signal generating means comprises (A-1) means for generating an unpolarized laser light beam and propagating it along said axis of propagation, and (A-2) means for linearly polarizing at least a portion of the unpolarized laser light beam, and (A-3) means for rotating the linearly polarized laser light beam about said axis of propagation, said rotating linearly polarized laser light beam has a rotating plane of polarization that constitutes said first signal component, said reference signal generating means further comprises (A-4) means for generating said second signal component when said rotating plane of polarization is oriented in said predetermined angular direction, and said reference signal generating means further comprises (A-4-a) means for deflecting a portion of the unpolarized laser light beam along an auxiliary axis of propagation therefore, (A-4-b) means interrupting the unpolarized laser light beam portion along said auxiliary axis of propagation and releasing a light pulse from the interrupted unpolarized laser light beam for propagation along said auxiliary axis when said rotating plane of polarization is oriented in said predetermined direction, and (A-4-c) means for combining the released light pulse of unpolarized laser light with said rotating linearly polarized laser light beam to provide a light beam composed of polarized and unpolarized light components.

10. A system for orienting the direction of a first object comprising (A) means for generating a reference direction indicating reference signal that includes a laser light beam with a first signal component that rotates at a uniform angular velocity about the axis of propagation of the beam and a second signal component that is detectable when the first signal component is oriented in a predetermined angular direction that constitutes said reference direction, said second signal component having a time duration that is small in comparison to the time required for a complete revolution of said first signal component about said axis, (B) means for receiving the reference signal and comparing said reference direction with the direction of said first object or with the direction of a second object that is equated in directional orientation thereto, said reference signal receiving and comparing means having an optical output signal that is indicative of the angular deviation between the compared directions, (C) means operating in dependence upon receipt of said optical output signal for analyzing said optical output signal and generating an electronic output signal that is indicative of said angular deviation, and (D) means operating in dependence upon receipt of said electronic output signal for controlling the directional orientation of said first object, said receiving and comparing means comprising (B-1) a polarizer arranged to receive and pass at least a portion of the reference signal and to thereby provide said optical output signal.

11. A system in accordance with claim 10 wherein said electronic output signal generating means comprises (C-1) light responsive means for transforming said optical output signal into an electronic signal having time spaced first and second signal components that are respectively associated with said first object's direction and said reference direction, and (C-2) means for determining the time spacing of the time spaced first and second signal components and generating said electronic output signal on the basis of such determination.

12. A system for orienting the direction of a first object comprising (A) means for generating a reference direction indicating reference signal that includes a laser light beam with a first signal component that rotates at a uniform angular velocity about the axis of propagation of the beam and a second signal component that is detectable when the first signal component is oriented in a predetermined angular direction that constitutes said reference direction, said second signal component having a time duration that is small in comparison to the time required for a complete revolution of said first signal component about said axis, (B) means for receiving the reference signal and comparing said reference direction with the direction of said first object or with the direction of a second object that is equated in directional orientation thereto, said reference signal receiving and comparing means having an optical output signal that is indicative of the angular deviation between the compared directions, (C) means operating in dependence upon receipt of said optical output signal for analyzing said optical output signal and generating an electronic output signal that is indicative of said angular deviation, and (D) means operating in dependence upon receipt of said electronic output signal for controlling the directional orientation of said first object, said reference signal generating means comprises (A-1) means for generating said laser light beam and propagating it along said axis of propagation, and (A-2) means for interrupting said laser light beam along said propagation axis to provide a shaped light beam with a predetermined image.

13. A system in accordance with claim 12 wherein said reference signal generating means further comprises (A-3) means for rotating the shaped light beam about said axis of propagation to provide a rotating image therein which constitutes said first signal component.

14. A system in accordance with claim 12 wherein said reference signal generating means further comprises (A-3) means for rotating the shaped light beam about said axis of propagation to provide a rotating image therein which constitutes said first signal component, and (A-4) means for generating the second signal component of the reference signal when the rotating image is oriented in said predetermined angular direction.

15. A system in accordance with claim 12 wherein said reference signal generating means further comprises
   (A-3) means for rotating the shaped light beam about said axis of propagation to provide a rotating image therein which constitutes said first signal component,
   said rotating means comprises
      (A-3-a) means supporting the light beam interrupting means and arranged to rotate about said axis of propagation, and
      (A-3-b) means for rotatably driving said supporting means.

16. A system in accordance with claim 12 wherein said reference signal generating means further comprises
   (A-3) means for rotating the shaped light beam about said axis of propagation to provide a rotating image therein which constitutes said first signal component,
   said rotating means comprises
      (A-3-a) means supporting the light beam interrupting means and arranged to rotate about said axis of propagation, and
      (A-3-b) means for rotatably driving said supporting means, and
   said reference signal generating means further comprises
   (A-4) means for generating said second signal component when the rotating image is oriented in said predetermined angular direction.

17. A system in accordance with claim 12 wherein said reference signal generating means further comprises
   (A-3) means for rotating the shaped light beam about said axis of propagation to provide a rotating image therein which constitutes said first signal component,
   said rotating means comprises
      (A-3-a) means supporting the light beam interrupting means and arranged to rotate about said axis of propagation, and
      (A-3-b) means for rotatably driving said supporting means, and
   said reference signal generating means further comprises
   (A-4) means for modulating the rotating shaped light beam when the rotating image therein is oriented in said predetermined angular direction to provide said second signal component.

18. A system for orienting the direction of a first object comprising
   (A) means for generating a reference direction indicating reference signal that includes
      a laser light beam with a first signal component that rotates at a uniform angular velocity about the axis of propagation of the beam and
      a second signal component that is detectable when the first signal component is oriented in a predetermined angular direction that constitutes said reference direction, said second signal component having a time duration that is small in comparison to the time required for a complete revolution of said first signal component about said axis,
   (B) means for receiving the reference signal and comparing said reference direction with the direction of said first object or with the direction of a second object that is equated in directional orientation thereto, said reference signal receiving and comparing means having an optical output signal that is indicative of the angular deviation between the compared directions,
   (C) means operating in dependence upon receipt of said optical output signal for analyzing said optical output signal and generating an electronic output signal that is indicative of said angular deviation, and
   (D) means operating in dependence upon receipt of said electronic output signal for controlling the directional orientation of said first object,
   said receiving and comparing means comprising
      (B-1) means having a light passageway arranged to receive and pass at least a portion of the reference signal and to thereby provide said optical output signal.

19. A system in accordance with claim 18 wherein said light passageway has a predetermined shape.

20. A system in accordance with claim 18 wherein said light passageway has a predetermined shape,
   said electronic output signal generating means comprises
      (C-1) light responsive means for transforming said optical output signal into an electronic signal having time spaced first and second signal components that are respectively associated with said first object's direction and said reference direction, and
      (C-2) means for determining the time spacing of the time spaced first and second signal components and generating said electronic output signal on the basis of such determination.

21. A system for orienting the direction of a first object comprising
   (A) means for generating a reference direction indicating reference signal that includes
      a light beam with a first signal component that rotates at a uniform angular velocity about the axis of propagation of the beam and
      a second signal component that is detectable when the first signal component is oriented in a predetermined angular direction that constitutes said reference direction, said second signal component having a time duration that is small in comparison to the time required for a complete revolution of said first signal component about said axis,
   (B) means for receiving the reference signal and comparing said reference direction with the direction of said first object or with the direction of a second object that is equated in directional orientation thereto, said reference signal receiving and comparing means having an optical output signal that is indicative of the angular deviation between the compared directions,
   (C) means operating in dependence upon receipt of said optical output signal for analyzing said optical output signal and generating an electronic output signal that is indicative of said angular deviation, and
   (D) means operating in dependence upon receipt of said electronic output signal for controlling the directional orientation of said first object, said reference signal generating means comprises
- (A-1) means for generating said light beam and propagating it along said axis of propagation, and
- (A-2) means for interrupting said light beam along said propagation axis to provide a shaped light beam with a predetermined image.

22. A system for orienting the direction of a first object comprising
- (A) means for generating a reference direction indicating reference signal that includes
  - a microwave beam with a first signal component that rotates at a uniform angular velocity about the axis of propagation of the beam and
  - a second signal component that is detectable when the first signal component is oriented in a predetermined angular direction that constitutes said reference direction, said second signal component having a time duration that is small in comparison to the time required for a complete revolution of said first signal component about said axis,
- (B) means for receiving the reference signal and comparing said reference direction with the direction of said first object or with the direction of a second object that is equated in directional orientation thereto, said reference signal receiving and comparing means having a first output signal that is indicative of the angular deviation between the compared directions,
- (C) means operating in dependence upon receipt of said first output signal for analyzing said first output signal and generating a second output signal that is indicative of said angular deviation, and
- (D) means operating in dependence upon receipt of said second output signal for controlling the directional orientation of said first object.

23. A system in accordance with claim 22 wherein said reference signal generating means comprises
- (A-1) means for generating the microwave beam and propagating it along said axis of propagation.

24. A system in accordance with claim 22 wherein said reference signal generating means comprises
- (A-1) means for generating a linearly polarized microwave beam and propagating it along said axis of propagation.

25. A system in accordance with claim 22 wherein said reference signal generating means comprises
- (A-1) means for generating a linearly polarized microwave beam and propagating it along said axis of propagation, and
- (A-2) means for rotating the linearly polarized microwave beam about axis of propagation, and
said rotating linearly polarized microwave beam has a rotating plane of polarization that constitutes said first signal component.

26. A system in accordance with claim 22 wherein said reference signal generating means comprises
- (A-1) means for generating a linearly polarized microwave beam and propagating it along said axis of propagation, and
- (A-2) means for rotating the linearly polarized microwave beam about said axis of propagation,
said rotating linearly polarized microwave beam has a rotating plane of polarization that constitutes said first signal component, and
said reference signal generating means further comprises
- (A-3) means for generating the second signal component when the rotating plane of polarization is oriented in said predetermined angular direction.

27. A system in accordance with claim 22 wherein said reference signal generating means comprises
- (A-1) means for generating a linearly polarized microwave beam and propagating it along said axis of propagation,
said linearly polarized microwave beam generating means comprises
  - (A-1-a) a wave guide, and
  - (A-1-b) a feed horn coupled to said wave guide,
said reference signal generating means further comprises
- (A-2) means for rotating the linearly polarized microwave beam about said axis of propagation,
said rotating linearly polarized microwave beam has a rotating plane of polarization that constitutes said first signal component, and
said rotating means comprises
  - (A-2-a) a wave guide output probe that is rotatably mounted and communicates with said feed horn, and
  - (A-2-b) means for rotatably driving said output probe.

28. A system in accordance with claim 22 wherein said reference signal generating means comprises
- (A-1) means for generating a linearly polarized microwave beam and propagating it along said axis of propagation,
said linearly polarized microwave beam generating means comprises
  - (A-1-a) a wave guide, and
  - (A-1-b) a feed horn coupled to said wave guide,
said reference signal generating means further comprises
- (A-2) means for rotating the linearly polarized microwave beam about said axis of propagation,
said rotating linearly polarized microwave beam has a rotating plane of polarization that constitutes said first signal component,
said rotating means comprises
  - (A-2-a) a wave guide output probe that is rotatably mounted and communicates with said feed horn, and
  - (A-2-b) means for rotatably driving said output probe, and
said reference signal generating means further comprises
- (A-3) means for generating the second signal component when the rotating plane of polarization is oriented in said predetermined angular direction.

29. A system in accordance with claim 22 wherein said reference signal generating means comprises
- (A-1) means for generating a linearly polarized microwave beam and propagating it along said axis of propagation,
said linearly polarized microwave beam generating means comprises
  - (A-1-a) a wave guide, and
  - (A-1-b) a feed horn coupled to said wave guide,
said reference signal generating means further comprises
- (A-2) means for rotating the linearly polarized microwave beam about said axis of propagation, said rotating linearly polarized microwave beam has a rotating plane of polarization that constitutes said first signal component, said reference signal generating means further comprises (A-3) means for generating the second signal component when the rotating plane of polarization is oriented in the predetermined angular direction, and said second signal component generating means comprises (A-3-a) means for generating and propagating a microwave pulse along another axis of propagation.

30. A system for orienting the direction of a first object comprising (A) means for generating a reference direction indicating reference signal that includes a microwave beam with a first signal component that rotates at a uniform angular velocity about the axis of propagation of the beam and a second signal component that is detectable when the first signal component is oriented in a predetermined angular direction that constitutes said reference direction, said second signal component having a time duration that is small in comparison to the time required for a complete revolution of said first signal component about said axis, (B) means for receiving the reference signal and comparing said reference direction with the direction of said first object or with the direction of a second object that is equated in directional orientation thereto, said reference signal receiving and comparing means having a first output signal that is indicative of the angular deviation between the compared directions, (C) means operating in dependence upon receipt of said first output signal for generating a second output signal that is indicative of said angular deviation, and (D) means operating in dependence upon receipt of said second output signal for controlling the directional orientation of said first object, said second output signal generating means comprises (C-1) means for analyzing said first output signal and generating said second output signal.

31. A system in accordance with claim 30 wherein said analyzing and generating means comprises (C-1-a) a heterodyne system for analyzing said first output signal and generating a third output signal that is indicative of said angular deviation, and (C-1-b) means for processing said third output signal and generating said second output signal.

32. A system in accordance with claim 30 wherein said analyzing and generating means comprises (C-1-a) a heterodyne system for analyzing said first output signal and generating a third output signal with time spaced first and second signal components that are respectively associated with said first object's direction and said reference direction, and (C-1-b) means for determining the time spacing of the timed spaced first and second signal components and generating said second output signal on the basis of such determination.

33. A system for use in indicating the directional orientation of a first object comprising (A) means for generating a reference direction indicating reference signal with a first signal component and a second signal component comprising means for generating and propagating a beam of electromagnetic radiation along an axis of propagation therefor, said beam having a component that rotates at a uniform angular velocity about said axis and constitutes said first signal component, and means for periodically generating a signal when the rotating component is oriented in a predetermined direction during its rotating movement about said axis, said periodically generated signal constituting said second signal component and having a time duration that is small in comparison to the time required for a complete revolution of said first signal component about said axis, and said predetermined direction constituting said reference direction, and (B) means for receiving the reference signal and comparing said reference direction with the direction of said first object or with the direction of another object that is equated in directional orientation thereto, said reference signal receiving and comparing means having an output signal that is indicative of the angular deviation between the compared directions and thereby indicative of the directional orientation of said first object.

34. A system in accordance with claim 33 wherein said beam of electromagnetic radiation is a laser beam of coherent light.

35. A system in accordance with claim 33 wherein said beam of electromagnetic radiation is a laser beam of coherent light, and said periodically generated signal is formed by an interrupted light beam.

36. A system in accordance with claim 33 wherein said beam of electromagnetic radiation is a beam of microwave energy.

37. A system is accordance with claim 33 wherein said periodically generated signal is formed by an interrupted light beam.

38. A system in accordance with claim 33 wherein said beam of electromagnetic radiation is a beam of polarized coherent light, and said periodically generated signal is formed by an interrupted beam of unpolarized coherent light.

39. A system in accordance with claim 33 wherein said beam of electromagnetic radiation is a light beam with a rotating image of predetermined shape that constitutes the first signal component.

40. A system in accordance with claim 33 wherein said beam of electromagnetic radiation is a beam of coherent light with a rotating image of predetermined shape that constitutes the first signal component.

41. A system in accordance with claim 33 wherein said beam of electromagnetic radiation is a beam of coherent light with a rotating image of predetermined shape that constitutes the first signal component, and said second signal component is formed by an interrupted light beam.

42. A system in accordance with claim 33 wherein said beam of electromagnetic radiation is a beam of coherent light with a rotating image of predetermined shape, and said second signal component is formed by interrupting said beam of coherent light.

43. A system in accordance with claim 33 wherein said beam of electromagnetic radiation is a polarized beam of microwave energy that is propagated along said axis, and said second signal component is formed by generating and propagating a microwave pulse along an axis of propagation therefore.

44. The method of indicating the directional orientation of a first object comprising (A) generating a reference direction indicating reference signal by generating and propagating a beam of electromagnetic radiation along an axis of propagation therefore, treating the beam to provide a first signal component that rotates about said axis at a uniform angular velocity, and generating a second signal component when the first signal component is oriented in a predetermined direction during its angular movement about the axis of propagation of the beam, said second signal component having a time duration that is small in comparison to the time required for a complete revolution of said first signal component about said axis and thereby to indicate said reference direction, and (B) receiving said reference signal and comparing said reference direction with the direction of said first object or with the direction of another object that is equated in directional orientation thereto to determine the angular deviation between the compared directions and thereby to indicate the directional orientation of said first object with respect to said reference direction.

45. The method in accordance with claim 44 wherein said beam of electromagnetic radiation comprises a laser beam of coherent light, the beam treatment providing the first signal component comprises rotating a half-wave plate at a uniform angular velocity about said axis, and passing the generated laser beam of coherent light through said half-wave plate to provide said first signal component as a light beam with a rotating plane of linearly polarized coherent light that propagates along said axis, and the generating of said second signal component comprises generating a pulse of light when said rotating plane of linearly polarized coherent light is oriented in said predetermined direction to thereby provide said second signal component.

46. The method in accordance with claim 44 wherein said beam of electromagnetic radiation comprises a laser beam of coherent light, the beam treatment providing the first signal component comprises rotating a light mask having an aperture with a predetermined shape at a uniform angular velocity about said axis, and passing a portion of the generated beam of coherent light through said aperture to provide said first signal component as a light beam with a rotating image of coherent light that propagates along said axis, and the generating of said second signal comprises periodically interrupting the beam of coherent light when said rotating image is oriented in said predetermined direction to thereby provide said second signal component.

47. The method in accordance with claim 44 wherein said beam of electromagnetic radiation comprises a linearly polarized microwave beam, the beam treatment providing the first signal component comprises maintaining a wave guide with a rotatable output probe in communication with a feed horn, passing the polarized microwave beam to said wave guide, and rotating said output probe at a uniform angular velocity about the axis of said feed horn to propagate said microwave beam along said axis of propagation and provide said first signal component as a microwave beam with a rotating plane of polarized microwave energy, the generating of said second signal component comprises periodically generating a microwave pulse and propagating it along an axis of propagation therefore when said rotating plane of polarized microwave energy is oriented in said predetermined direction to thereby provide said second signal component.

48. The method of generating a reference signal with a reference direction for use as a directional reference in orienting objects comprising generating a beam of electromagnetic radiation and propagating the beam along an axis of propagation therefore, treating the beam to provide a first signal component of the reference signal that rotates about said axis at a uniform angular velocity, and generating and transmitting a second signal component of the reference signal when the first signal component is oriented in a predetermined angular direction during its angular movement about the axis, said second signal component having a time duration that is small in comparison to the time required for a complete rotation of said first signal component about said axis, and said predetermined angular direction constituting said reference direction.

49. A system for orienting the direction of a first object comprising (A) means for generating a reference direction indicating reference signal that includes a beam of electromagnetic radiation with a first signal component that rotates at a uniform angular velocity about the axis of propagation of the beam and a second signal component that is detectable when the first signal component is oriented in a predetermined angular direction that consistutes said reference direction, said second signal component having a time duration that is small in comparison to the time required for a complete revolution of said first signal component about said axis, (B) means for receiving the reference signal and comparing said reference direction with the direction of said first object or with the direction of a second object that is equated in directional orientation thereto, said reference signal receiving and comparing means having a first output signal that is indicative of the angular deviation between the compared directions, (C) means operating in dependence upon receipt of said first output signal for analyzing said first output signal and generating a second output signal that is indicative of said angular deviation, and (D) means operating dependence upon receipt of said second output signal for controlling the directional orientation of said first object.

50. A system for orienting the direction of a visual display appearing on a video display device which is mounted on and moveable with a ground vehicle used in traversing a predetermined area comprising (A) means for generating a reference direction indicating reference signal with a first signal component and a second signal component comprising means for generating and propagating a beam of electromagnetic radiation along an axis of propagation into said predetermined area, said beam having a component that rotates at a uniform angular velocity about said axis and constitutes said first signal component, and means for periodically generating a signal when the rotating component is oriented in a predetermined direction during its rotating movement about said axis, said periodically generated signal being detectable in said predetermined area and constituting said second signal component, said periodically generated signal having a time duration that is small in comparison to the time required for a complete revolution of said first signal component about said axis, and said predetermined direction constituting said reference direction, and (B) means mounted on the vehicle for receiving the reference signal and comparing said reference direction with either the direction of the vehicle or the direction of an object that is equated in directional orientation thereto, said reference signal receiving and comparing means having an output signal that is indicative of the angular deviation between the compared directions, and (C) means mounted on the vehicle and operating in dependence upon receipt of said output signal for controlling the directional orientation of said visual display.

51. A system in accordance with claim 50 wherein said vehicle is a self-propelled ground vehicle.

52. A system in accordance with claim 50 wherein said beam of electromagnetic radiation is a beam of laser light.

53. A system for orienting the direction of a self-propelled vehicle that has a steering system and is used in traversing a predetermined area comprising (A) means for generating a reference direction indicating reference signal with a first signal component and a second signal component comprising means for generating and propagating a beam of electromagnetic radiation along an axis of propagation into said predetermined area, said beam having a component that rotates at a uniform angular velocity about said axis and constitutes said first signal component, and means for periodically generating a signal when the rotating component is oriented in a predetermined direction during its rotating movement about said axis, said periodically generated signal being detectable in said predetermined area and constituting said second signal component, said periodically generated signal having a time duration that is small in comparison to the time required for a complete revolution of said first signal component about said axis, and said predetermined direction constituting said reference direction, and (B) means mounted on the vehicle for receiving the reference signal and comparing said reference direction with either the direction of the vehicle or the direction of an object that is equated in directional orientation thereto, said reference signal receiving and comparing means having an output signal that is indicative of the angular deviation between the compared directions, and (C) means mounted on the vehicle and operating in dependence upon receipt of said output signal for controlling the directional orientation of said vehicle, said vehicle direction controlling means including said steering system.

54. A system in accordance with claim 53 wherein said vehicle is a self-propelled ground vehicle.

55. A system in accordance with claim 53 wherein said beam of electromagnetic radiation is a beam of microwave energy.

56. A system for orienting the direction of a visual display appearing on a video display device which is mounted on and moveable with a ground vehicle used in traversing a predetermined area comprising (A) means for generating a reference signal with a detectable reference direction, (B) means for passing the reference signal into said predetermined area, (C) means mounted on the vehicle for receiving the reference signal and comparing said reference direction with either the direction of the vehicle or the direction of an object that is equated in directional orientation thereto, said reference signal receiving and comparing means having an output signal that is indicative of the angular deviation between the compared directions, and (C) means mounted on the vehicle and operating in dependence upon receipt of said output signal for controlling the directional orientation of said visual display.

57. The system in accordance with claim 56 wherein said reference signal generating means has first and second signal components and comprises means for generating and propagating a beam of electromagnetic radiation along an axis of propagation, said beam having a component that rotates at a uniform angular velocity about said axis and constitutes the first signal component, and means for periodically generating a signal when the rotating component is oriented in a predetermined direction during its rotating movement about said axis, said periodically generated signal being detectable in said predetermined area and constituting said second signal component, said periodically generated signal having a time duration that is small in comparison to the time required for a complete revolution of said first signal component about said axis, and said predetermined direction constituting said reference direction.

58. A system for orienting the direction of a vehicle used in traversing a predetermined area comprising
   (A) means for generating a reference signal with a detectable reference direction,
   (B) means for passing the reference signal into said predetermined area,
   (C) means mounted on the vehicle for receiving the reference signal and comparing said reference direction with either the direction of the vehicle or the direction of an object that is equated in directional orientation thereto, said reference signal receiving and comparing means having an output signal that is indicative of the angular deviation between the compared directions, and
   (D) means mounted on the vehicle and operating in dependence upon receipt of said output signal for controlling the directional orientation of said vehicle.

59. The system in accordance with claim 58 wherein said reference signal generating means has first and second signal components and comprises
   means for generating and propagating a beam of electromagnetic radiation along an axis of propagation, said beam having a component that rotates at a uniform angular velocity about said axis and constitutes the first signal component, and
   means for periodically generating a signal when the rotating component is oriented in a predetermined direction during its rotating movement about said axis, said periodically generated signal being detectable in said predetermined area and constituting said second signal component, said periodically generated signal having a time duration that is small in comparison to the time required for a complete revolution of said first signal component about said axis, and said predetermined direction constituting said reference direction.

* * * * *